US005830984A

United States Patent [19]
Katz et al.

[11] Patent Number: 5,830,984
[45] Date of Patent: Nov. 3, 1998

[54] SYNTHESIS OF OPTICALLY ACTIVE HELICAL LADDER POLYMERS WITH UNBROKEN DOUBLE-BOND CONJUGATION

[75] Inventors: Thomas J. Katz, New York, N.Y.; Yujia Dai, Bloomington, Ind.

[73] Assignee: The Trustees of Columbia University in the City of New York, New York, N.Y.

[21] Appl. No.: 671,417

[22] Filed: Jun. 27, 1996

[51] Int. Cl.$^6$ .......................... C08G 69/00; C08G 69/26
[52] U.S. Cl. ..................... 528/327; 528/310; 528/319; 528/331; 528/341; 528/347
[58] Field of Search ................... 528/319, 310, 528/327, 331, 341, 347

[56] References Cited

PUBLICATIONS

Chen, H. et al. (1995) Synthesis and Characterization of Two New Schiff–Bases and Their Soluble Linear Cerium (IV) Polymers. Inorg. Chem. 34:2306–2315; The publication date is not available.

Costamagna, J. et al. (1992) Coordination compounds of copper, nickel and iron with Schiff bases derived from hydroxynapthaldehydes and salicylaldehydes. Coord. Chem. Rev. 119:67–88; The month in the date of publication is not available.

Costes, J.P. et al. (1995) Geometrical and Optical Isomers of the Nickel(II) Complexes of Chiral Tetradentate Unmixed And Mixed Schiff Bases: CD and NMR Spectroscopic Studies. Polyhedron 14:2179–2187; The publication date is not available.

Langeveld–Voss, B.M.W. et al. (1996) Circular Dichroism and Circular Polarization of Photoluminescence of Highly Ordered Poly(3,4–di[(S)–2–methylbutoxy] thiophene). J. Am. Chem. Soc. 118:4908–4909; The publication date is not available.

Nuckolls, C. et al. (1996) Aggregation of Conjugated Helical Molecules. J. Am. Chem. Soc. 118:3767–3768; The publication date is not available.

Salaneck, W.R. et al. Conjugated Polymers and Related Materials: The Inter–connection of Chemical and Electronic Structure. Oxford University Press, Oxford, 1993; The month in the date of publication is not available.

Scherf, U. and Mullen, K. (1995) The Synthesis of Ladder Polymers. Adv. Polym. Sci. 123:1–40; The publication date is not available.

Willmore, N.D. et al. (1992) A Diels–Alder Route to [5]– and [6]–Helicences Angew. Chem. Int. Ed. 31:1093–1095.

Gilbert, A. M., et al. "Synthesis and Properties of an Optically Active Helical Bis–cobaltocenium Ion", J. Am. Chem. Soc. (1993) 115: 3199–3211 (Exhibit B); The month in the date of the publication is not available.

Katz, T.J. and Jaan, P., "Synthesis of a Helical Ferrocene", J. Am. Chem. Soc. (1982) 104: 346–347 (Exhibit C); The date of publication is not available.

Katz, T.J., et al., "Synthesis and Properties of Optically Active Helical Metallocene Oligomers", J. Am. Chem. Soc. (1993) 115: 3182–3198 (Exhibit D); The month in the date of publication is not available.

Sudhakar, A. and Katz, T.J., "Asymmetric Synthesis of Helical Metallocenes", J. Am. Chem. Soc. (1986) 108: 179–181 (Exhibit E); and The month in the date of publication is not available.

Sudhakar, A., et al., "Synthesis of a Helical Metallocene Oligomer", J. Am. Chem. Soc. (1986) 108: 2790–2791 (Exhibit F). The month in the date of publication is not available.

*Primary Examiner*—P. Hampton-Hightower
*Attorney, Agent, or Firm*—John P. White; Cooper & Dunham LLP

[57] ABSTRACT

Optically active ladder polymers that are chiral and have an unbroken network of conjugated double bonds along a helical path are synthesized.

9 Claims, 16 Drawing Sheets

$R_1 = CH_2CH_2OCH_2CH_2CH_2CH_3$

Scheme 1 a) o-phenylenediamine in refluxing ethanol, then Ni(OAc)₂ in refluxing THF-EtOH (95%)

$R_1 = CH_2CH_2OCH_2CH_2CH_2CH_3$

FIG. 7

Scheme 2

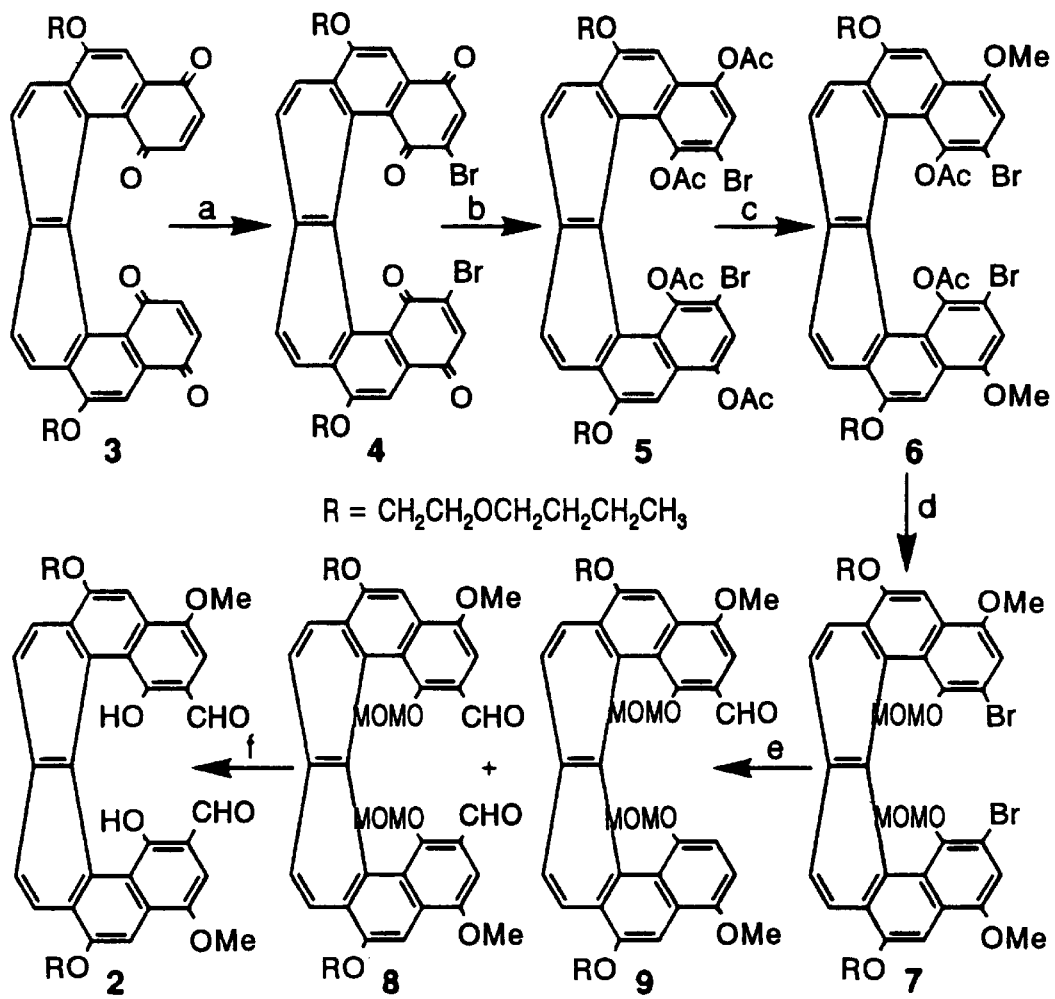

Scheme 2. Route to optically active helical bis-salicylaldehyde 2 from optically active helical bis-quinone 3. a) HBr in EtCO$_2$H, then chloranil (25-30%); b) Na$_2$S$_2$O$_4$, n-Bu$_4$NBr, H$_2$O-CH$_2$Cl$_2$, then Ac$_2$O, Et$_3$N, CH$_2$Cl$_2$ (78-82%); c) K$_2$CO$_3$, MeOH, 25 °C, then MeI, K$_2$CO$_3$, acetone, reflux (81%); d) KOt-Bu, THF, 25 °C, then MeOCH$_2$Cl (MOMCl), THF, 25 °C (92%); e) n-BuLi, THF, −78 °C, then Me$_2$NCHO, −78 to 25 °C (80% 8, 16% 9); f) H$_2$SO$_4$, HOAc, H$_2$O, 60 °C (100%).

Scheme 3

FIG. 9
Scheme 4
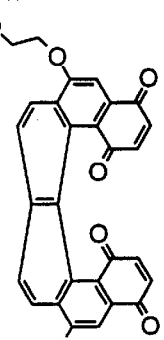
1
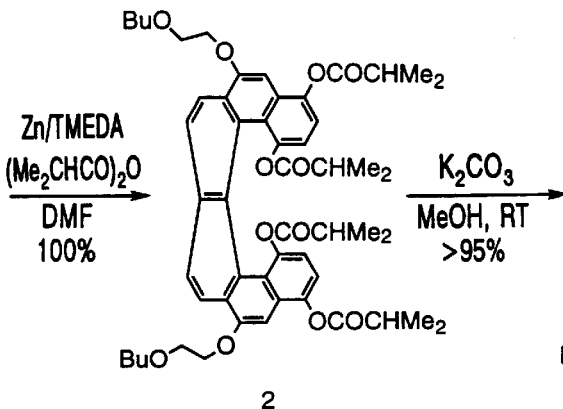
2
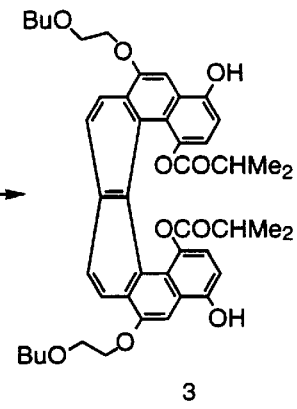
3
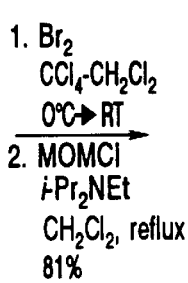
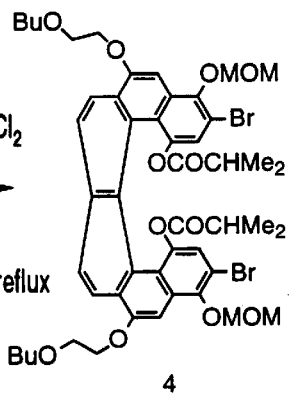
4
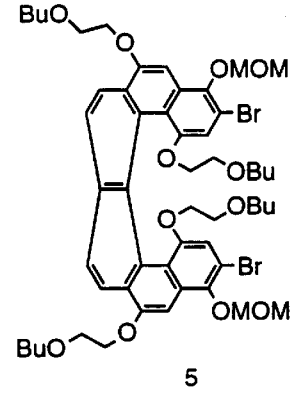
5
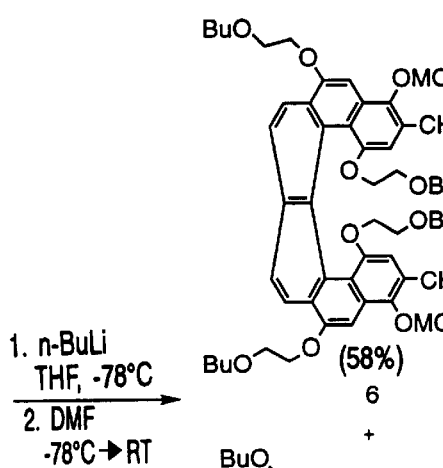
6 (58%)
+
7 (19%)
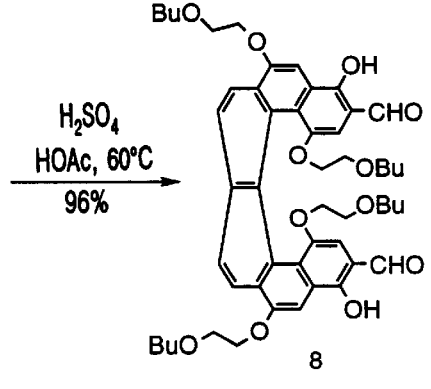
8
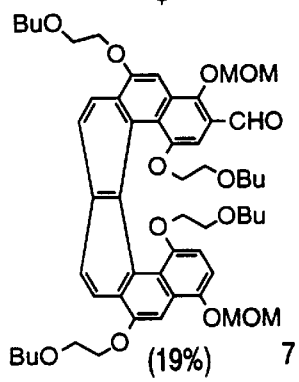
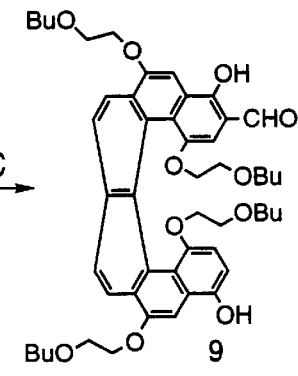
9

FIG. 10
Formulas 10 & 11
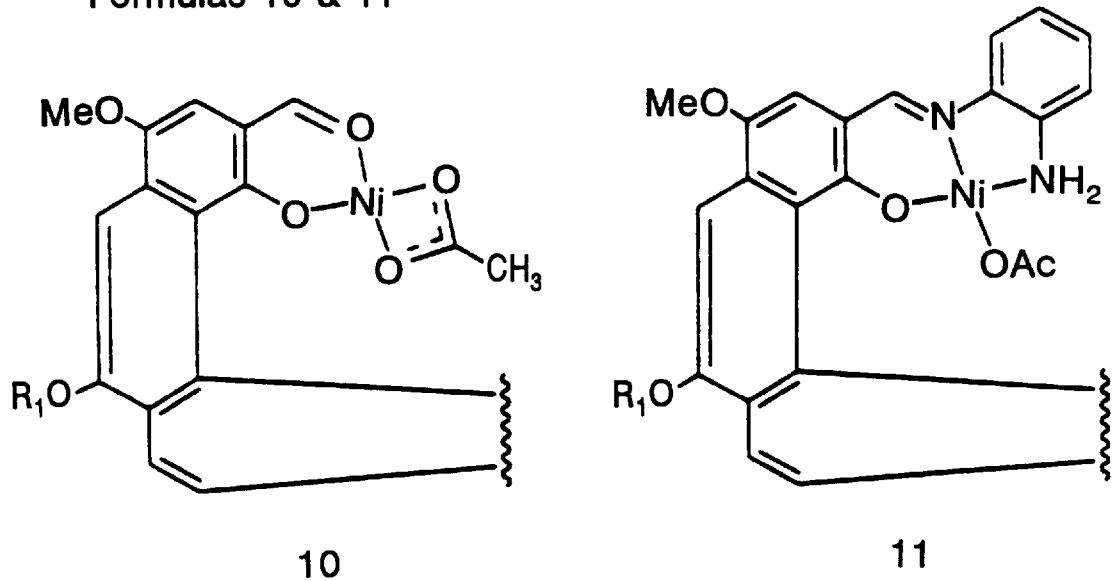
$R_1 = CH_2CH_2OCH_2CH_2CH_2CH_3$

FIG. 11

| C | H | N | Ni | O | Calcd | Found | Calcd − Found | Diff. 1 | Diff. 2 |
|---|---|---|---|---|---|---|---|---|---|
| 42 | 46 | 0 | 1 | 12 | 801.501 | 801.17 | −0.331 | | |
| 48 | 52 | 2 | 1 | 11 | 891.627 | 891.40 | −0.227 | 90.23 | |
| 90 | 92 | 2 | 2 | 20 | 1639.082 | 1639.12 | 0.038 | | 837.95 |
| 96 | 98 | 4 | 2 | 19 | 1729.208 | 1729.32 | 0.112 | 90.2 | 837.92 |
| 138 | 138 | 4 | 3 | 28 | 2476.663 | 2476.9 | 0.237 | | 837.78 |
| 144 | 144 | 6 | 3 | 27 | 2566.789 | 2566.94 | 0.151 | 90.04 | 837.62 |
| 186 | 184 | 6 | 4 | 36 | 3314.244 | 3314.72 | 0.476 | | 837.82 |
| 192 | 190 | 8 | 4 | 35 | 3404.370 | 3404.51 | 0.140 | 89.79 | 837.57 |
| 234 | 230 | 8 | 5 | 44 | 4151.825 | 4152.33 | 0.505 | | 837.61 |
| 240 | 236 | 10 | 5 | 43 | 4241.950 | 4241.94 | −0.010 | 89.61 | 837.43 |
| 282 | 276 | 10 | 6 | 52 | 4989.405 | 4989.51 | 0.105 | | 837.18 |
| 288 | 282 | 12 | 6 | 51 | 5079.531 | 5079.5 | −0.031 | 89.99 | 837.56 |
| 330 | 322 | 12 | 7 | 60 | 5826.986 | 5826.92 | −0.066 | | 837.41 |
| 336 | 328 | 14 | 7 | 59 | 5917.112 | 5917.14 | 0.028 | 90.22 | 837.64 |

| 48 | 46 | 2 | 1 | 8 | 837.581 |
|---|---|---|---|---|---|
| 6 | 6 | 2 | 0 | −1 | 90.126 |

| | | |
|---|---|---|
| Average = | 90.01 | 837.62 |
| Standard Dev. = | 0.24 | 0.22 |

Diff. 1 is the difference between the Found mass and the entry two above.
Diff. 2 is the difference between the Found mass and the entry immediately above.

Scheme 5

SYNTHESIS OF OPTICALLY ACTIVE HELICAL LADDER POLYMERS WITH UNBROKEN DOUBLE-BOND CONJUGATION

The invention described herein was made in the course of work under Grant No. NSFCHE92-24634 from the National Science Foundation. The U.S. Government has certain rights in this invention.

CROSS REFERENCE TO RELATED APPLICATION

Background of the Invention

Molecules with extended arrays of conjugated double bonds are the basis for an enormous variety of materials that, because of their electronic and optical properties, are used or show significant promise to be useful in a variety of applications. Conjugated polymers that are chiral are known in the art. See for example, W. R. Sananeck et al. "Conjugated Polymers and Related Materials: the Interconnection of Chemical and Electronic Structure", Oxford University Press, Oxford, 1993. Ladder polymers that are planar are also known in the art. However, a major disadvantage of many of these planar structures is their insolubility in numerous solvents.

SUMMARY OF THE INVENTION

Accordingly, it is an object of the present invention to impose handedness or chirality on carriers of electrons and excitation energy. More specifically, it is an object of the present invention to synthesize optically active, chiral helical ladder polymers with good solubility.

The present invention comprises the first optically active polymeric material in which an extended array of double bonds winds along a helical pathway or, more generally, along a chiral pathway. Unlike other ladder polymers it is chiral, and unlike other optically active conjugated polymers such as polythiophenes, its helicity is preserved by unaggregated molecules in solution.

The present invention comprises an optically active ladder polymer with conjugated double bonds on a helical path. Two helical structures are created using similar procedures.

In particular the present invention comprises a helical ladder polymer having the structure:

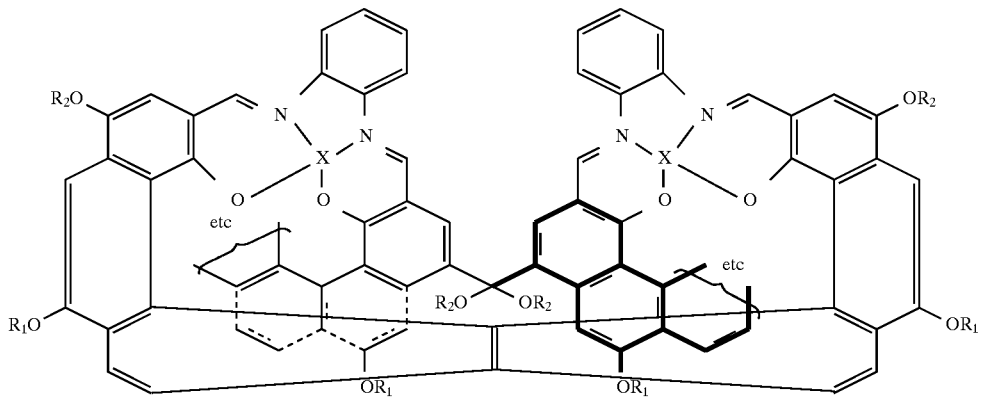

wherein $R_1$ and $R_2$ may be the same or different and each may be an aryl group substituted or unsubstituted, an arylalky group substituted or unsubstituted, a straight or branched alkyl group substituted or unsubstituted, or a straight or branched alkenyl group substituted or unsubstituted; and X is a metal.

The present invention also comprises a helical ladder polymer having the structure:

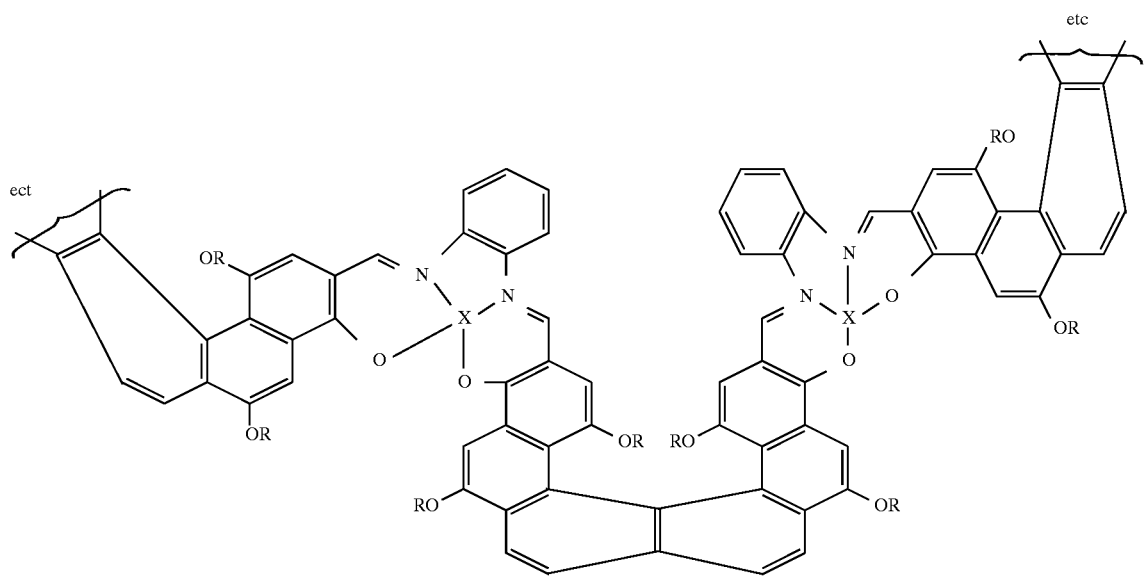

wherein R is an aryl group substituted or unsubstituted, an arylalkyl group substituted or unsubstituted, a straight or branched alkyl group substituted or unsubstituted, or a straight or branched alkenyl group substituted or unsubstituted; and X is a metal.

The present invention provides for both racemic and non-racemic polymers.

The present invention further comprises the synthesis of the above described polymers.

The inventive products may be useful in applications where electroluminescence or photoluminescence are desired. In particular, the products of the present invention may be useful where it is advantageous to have the luminescence circularly polarized.

BRIEF DESCRIPTION OF THE FIGURES

FIG. 1 shows the structure of a helical conjugated ladder polymer having a helix that winds in one direction.

FIG. 2 shows the structure of a helical conjugated ladder polymer wherein the helical path winds in one direction along the carbon skeleton and in an opposite direction through the metal-coordination array.

FIG. 3 shows an embodiment of the helical conjugated ladder polymer depicted in FIG. 1.

FIG. 4 shows the starting compound used to synthesize the helical bis-salicylaldehyde monomer.

FIG. 5 shows a portion of the structure depicted in FIG. 1, showing 3 helicene rings and 2 salophens (side chains not shown).

FIG. 7. Reaction scheme 2, showing the synthesis of the helical bis-salicylaldehyde monomer used in the reaction shown in FIG. 6.

FIG. 9. Reaction scheme 4 showing the synthesis of bis-salicylaldehyde monomer used in the reaction shown in FIG. 8.

FIG. 10. FIG. 10 shows the structure of polymer end groups for the polymer depicted in FIG. 3.

FIG. 11. FIG. 11 shows an analysis of the mass spectrum of helical nickel salophen Polymer 1.

FIG. 12 shows CD and UV Spectra of Nickel Salophen Oligomer 1.

FIG. 13 shows helical metal coordination polymers.

FIG. 15 shows the compound used to synthesize the helical ladder polymer shown in FIG. 1.

FIG. 16 shows the compound used to synthesize the helical ladder polymer shown in FIG. 2.

DETAILED DESCRIPTION

Figure 1:
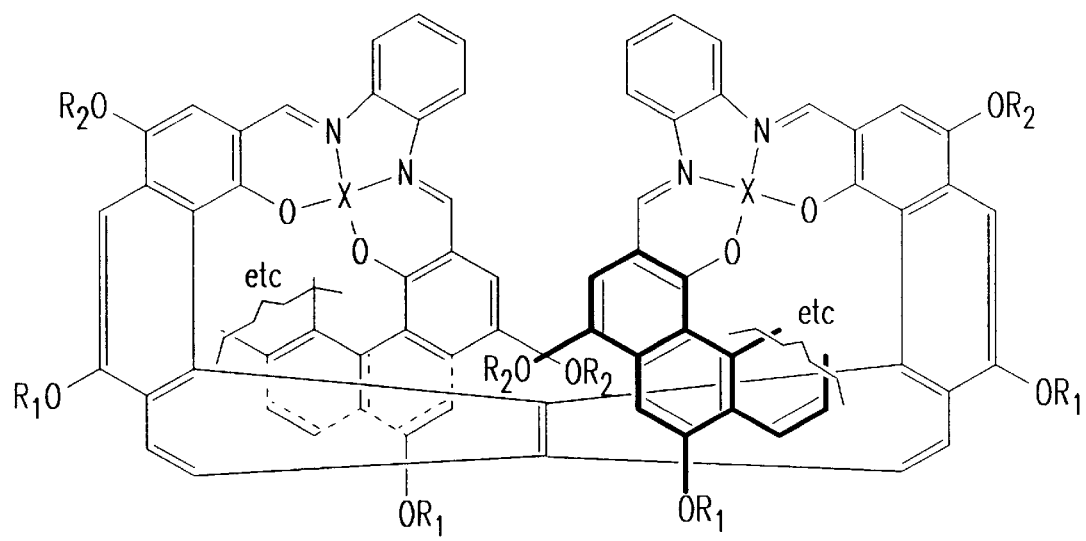
FIG. 1.
Figure 2:
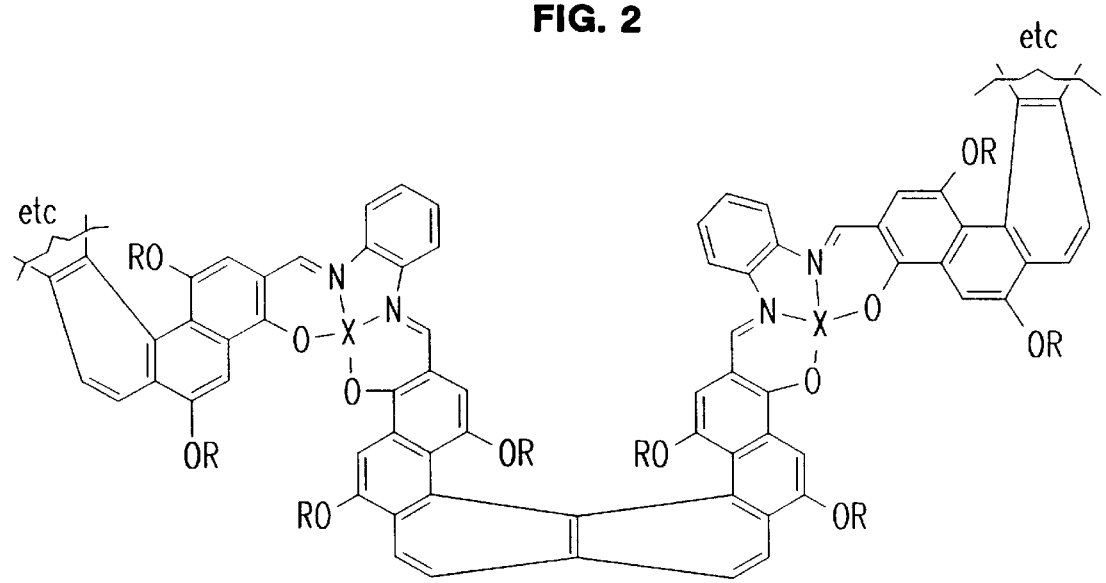
FIG. 2.

The invention is useful in applications where photoluminescence or electroluminescence is desired, or where it is desirable to circularly polarize light. The invention may be useful in display devices, switches and sensors. Examples of devices include, but are not limited to instruments, gauges, sensors, light emitting diodes and other light emitting devices.

The present invention comprises a helical ladder polymer having the structure:

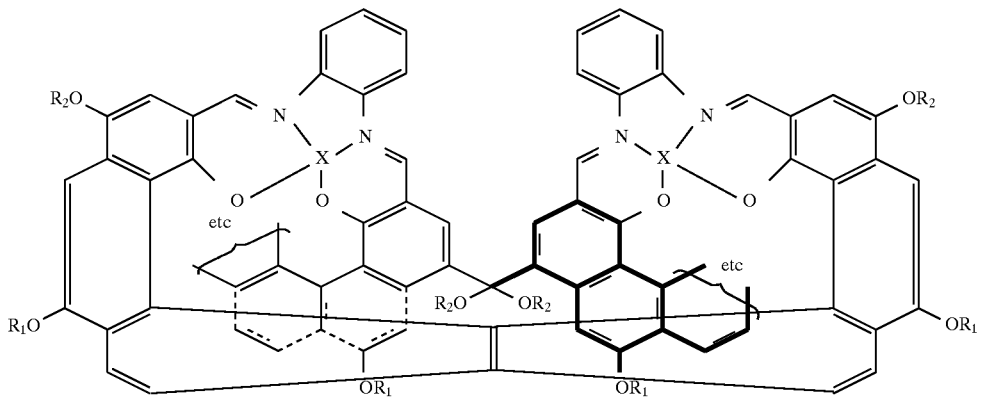

wherein $R_1$ and $R_2$ may be the same or different and each may be an aryl group substituted or unsubstituted, an arylalky group substituted or unsubstituted, a straight or branched alkyl group substituted or unsubstituted, or a straight or branched alkenyl group substituted or unsubstituted; and X is a metal.

The present invention comprises the above helical ladder polymer wherein $R_1$ is $CH_2CH_2OCH_2CH_2CH_2CH_3$; $R_2$ is Me; and X is Ni, Cu or Co.

The invention further comprises a helical ladder polymer having the structure:

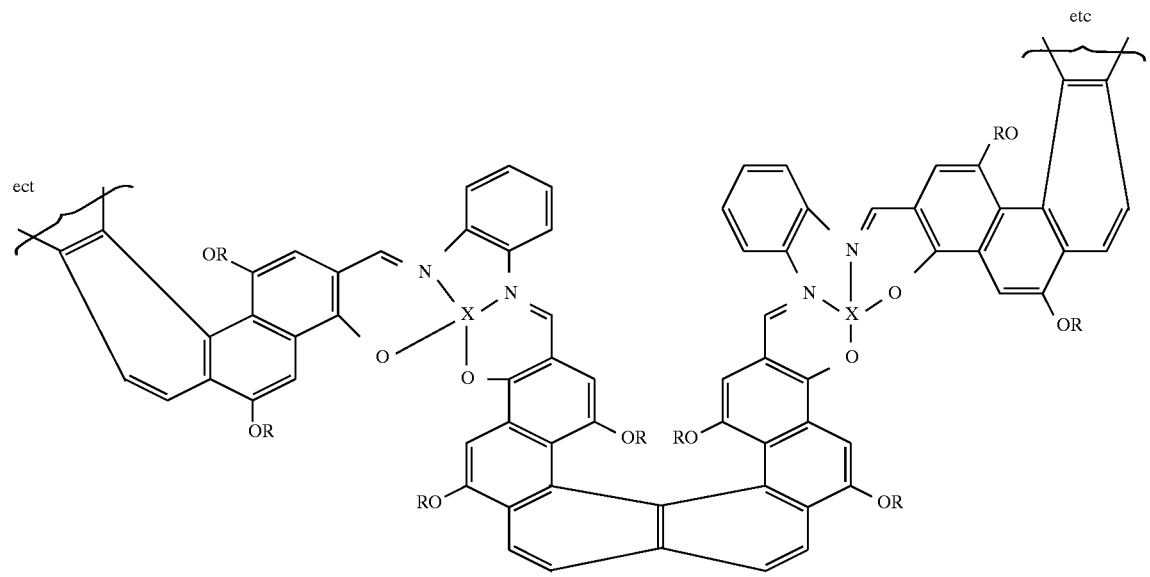

wherein R is an aryl group substituted or unsubstituted, an arylalkyl group substituted or unsubstituted, a straight or branched alkyl group substituted or unsubstituted, or a straight or branched alkenyl group substituted or unsubstituted; and X is a metal.

The invention comprises the above helical ladder polymer wherein R is $-CH_2CH_2OCH_2CH_2CH_2CH_3$ and X is Ni Cu or Co.

The invention also comprises the above described polymers that are non-racemic.

The invention also provides a compound comprising a metal ion that is coordinated to a helical ligand.

The invention also provides the above compound wherein the metal ion is Nickel.

The invention also provides the above compound wherein the helical ligand is non-racemic.

The invention further provides a polymer comprising a metal ion that is coordinated to a helical ligand.

The invention further provides the above polymer wherein the polymer is a dimer.

The invention also provides the above polymer that is non-racemic.

The invention further comprises a process for synthesizing a helical ladder polymer having the structure:

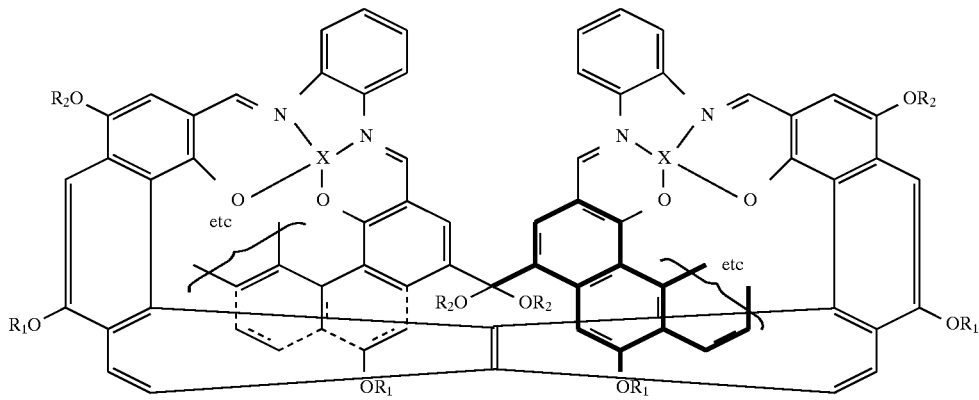

wherein $R_1$ and $R_2$ may be the same or different and each may be an aryl group substituted or unsubstituted, an arylalky group substituted or unsubstituted, a straight or branched alkyl group substituted or unsubstituted, or a straight or branched alkenyl group substituted or unsubstituted; and X is a metal which comprises:
reacting a compound having a structure:

wherein R is an aryl group substituted or unsubstituted, an arylalkyl group substituted or unsubstituted, a straight or branched alkyl group substituted or unsubstituted, or a straight or branched alkenyl group substituted or unsubstituted with 1,2 - phenylenediamine and a metal chelating agent selected from the group of metal salts to form the helical ladder polymer.

The invention further comprises a process for synthesizing a helical ladder polymer having the structure:

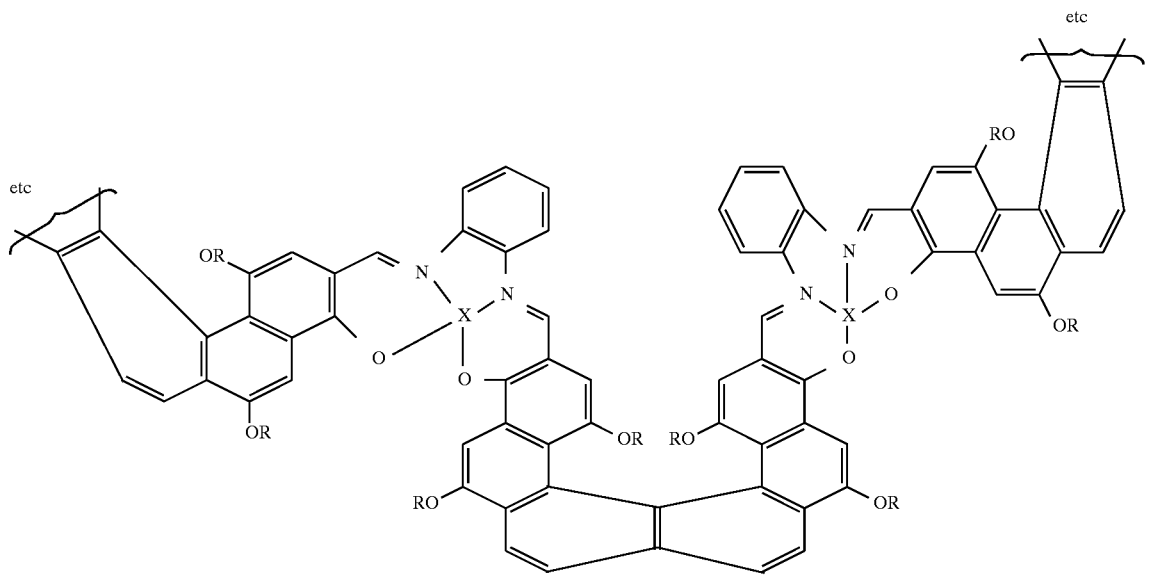

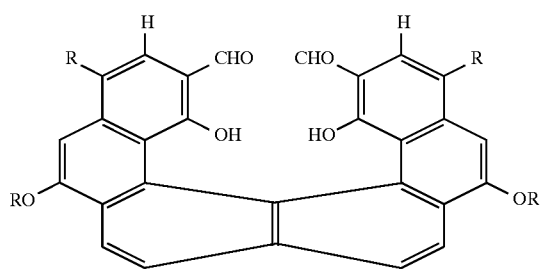

wherein R is an aryl group substituted or unsubstituted, an arylalkyl group substituted or unsubstituted, a straight or branched alkyl group substituted or unsubstituted, or a straight or branched alkenyl group substituted or unsubstituted; and X is a metal which comprises:

reacting a compound having the structure:

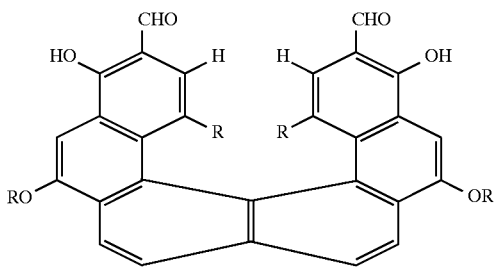

wherein R is an aryl group substituted or unsubstituted, an arylalkyl group substituted or unsubstituted, a straight or branched alkyl group substituted or unsubstituted, or a straight or branched alkenyl group substituted or unsubstituted with 1,2 - phenylenediamine and a metal chelating agent selected from the group of metal salts to form the helical ladder polymer.

One preferred embodiment of the invention comprises the synthesis of an optically active polymeric material with an unbroken network of double bonds that winds in one direction along a helix.

The invention further comprises an optically active ladder polymer having conjugated double bonds on a chiral path.

The invention also comprises an optically active ladder polymer having conjugated double bonds on a helical chiral path.

The invention further comprises an optically active ladder polymer, having an unbroken network of double bonds that wind in one direction along a helix.

The invention further comprises an optically active ladder polymer having an unbroken network of double bonds, comprising a carbon skeleton and a metal-coordination array, wherein the helical path winds in one direction along the carbon skeleton and in an opposite direction through the metal-coordination array.

The invention comprises a process for making an optically active ladder polymer comprising reacting a helicene having salicylaldehyde's functionality at each end with a 1,2-phenylenediamine and a metal chelating agent.

Figure 4:
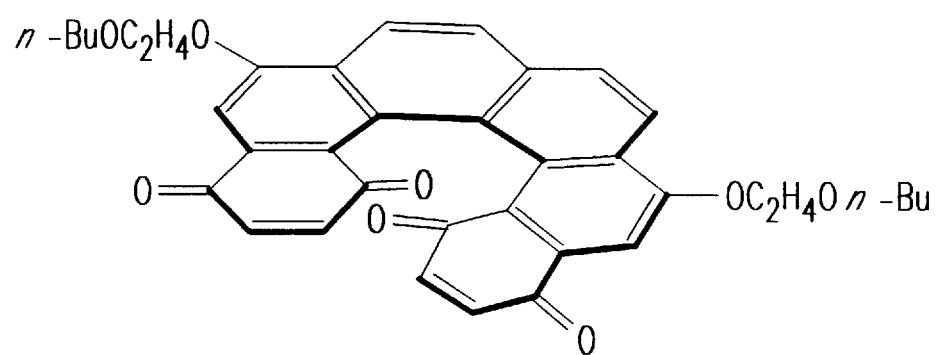
FIG. 4.
Figure 5:
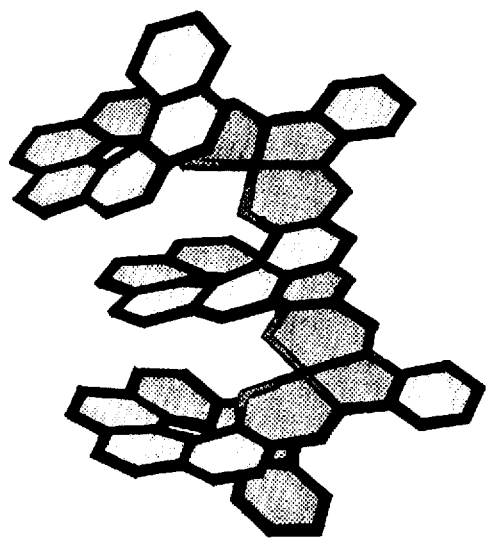
FIG. 5.
Figure 6:
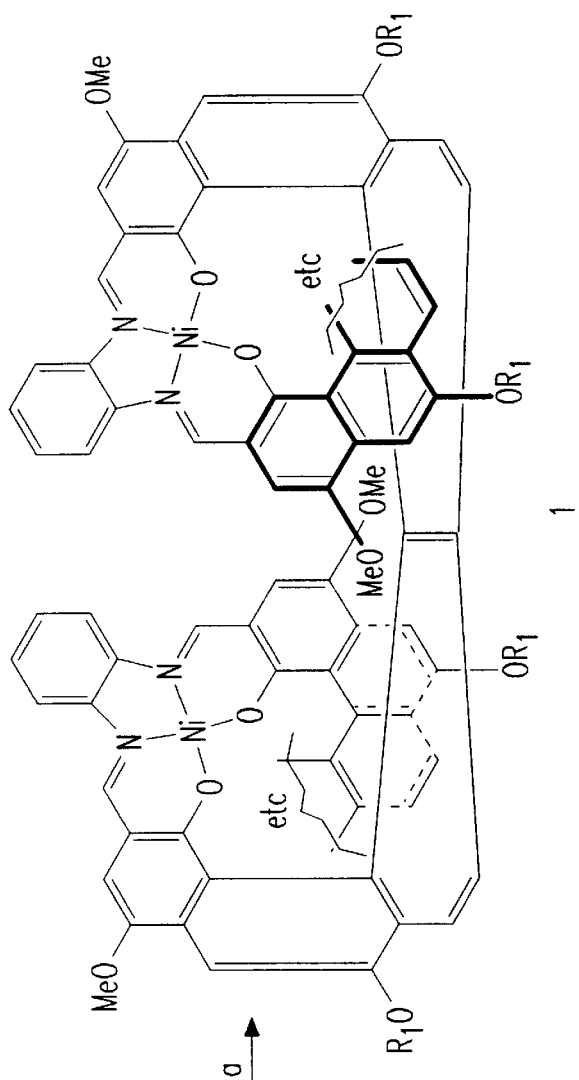
FIG. 6. Reaction scheme 1, showing the synthesis of the helical conjugated ladder polymer depicted in FIG. 3.

The monomers for the synthesis were prepared from the non-racemic compound depicted in FIG. 4 according to the reaction schemes depicted in FIG. 7 and FIG. 9.

Various types of chelating materials may be used including, but not limited to metal salts such as Copper salts, Nickel salts and Cobalt salts.

$R_1$ may be any unsubstituted or substituted hydrocarbon. Possible substituents include but are not limited to the following groups: halo-, nitro, mercapto, alkylhalo- , arylhalo-, silyl-, alkylsilyl-, arylsilyl-, amino-, dialkylamino-, arylamino-, alkoxy, aryloxy, alkylmercapto, arylmercapto and derivatives thereof.

$R_2$ may be any unsubstituted or substituted hydrocarbon. Possible substituents include but are not limited to the following groups: halo-, nitro, mercapto, alkylhalo- , arylhalo-, silyl-, alkylsilyl-, arylsilyl-, amino-, dialkylamino-, arylamino-, alkoxy, aryloxy, alkylmercapto, arylmercapto and derivatives thereof.

R may be any unsubstituted or substituted hydrocarbon. Possible substituents include but are not limited to the following groups: halo-, nitro, mercapto, alkylhalo- , arylhalo-, silyl-, alkylsilyl-, arylsilyl-, amino-, dialkylamino-, arylamino-, alkoxy, aryloxy, alkylmercapto, arylmercapto and derivatives thereof.

Figure 3:
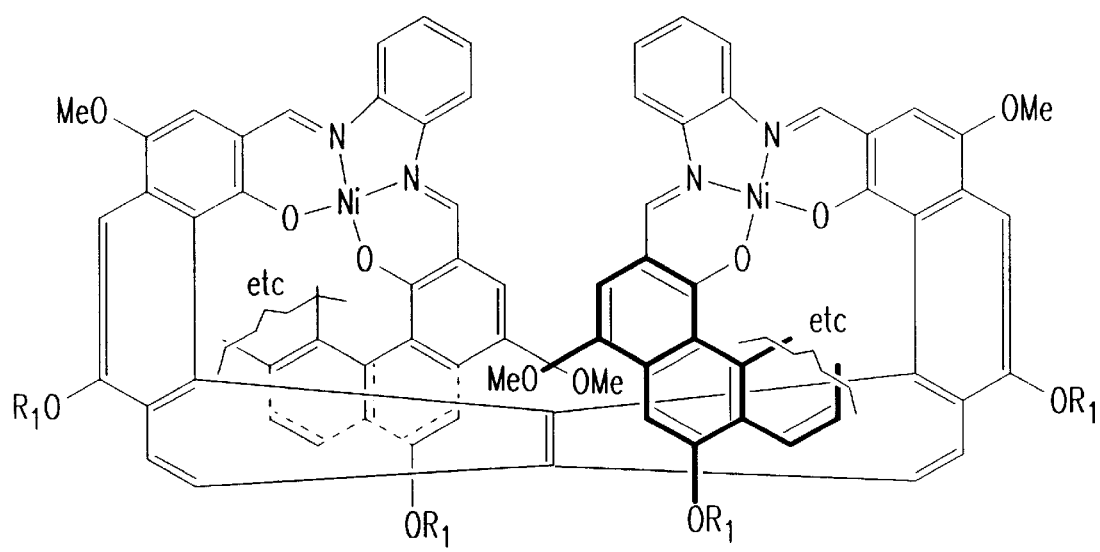
FIG. 3.

Those skilled in the art will be able to select R, $R_1$ and $R_2$ according to solubility characteristics desired of the polymer, which is advantageous. The inventive polymer depicted in FIG. 3, for example, has excellent solubility in various solvents, including chloroform.

This invention is further illustrated in the Experimental Details section that follows. This section is set forth to aid in an understanding of the invention but is not intended to, and should not be construed to limit in any way the invention set forth in the claims which follow.

EXPERIMENTAL DETAILS

Reported here is the synthesis of the first polymer (1) with an unbroken network of double bonds that winds in one direction along a helix. The key step is the union of a helicene (aromatic hydrocarbon ring structure) possessing salicylaldehyde's functionality at each end, 1,2-phenylenediamine, and nickel acetate to give a structure (Scheme 1 and FIG. 1) in which "nickel salophen" (Nickel N,N'-bis-(o-oxybenzylidene)phenylenediamine or (N,N'-Disalicylidene-1,2-phenylenediaminato)nickel(II) or N,N',O,O-{2,2'-[1,2-phenylenebis(nitrilomethylidyne)]bis[phenolato]} (2-) nickel) units bind adjacent helicenes, provide a conjugated link from one ring system to the next, and constrain the p-orbitals of the rings they unite to be nearly parallel.

Figure 8:
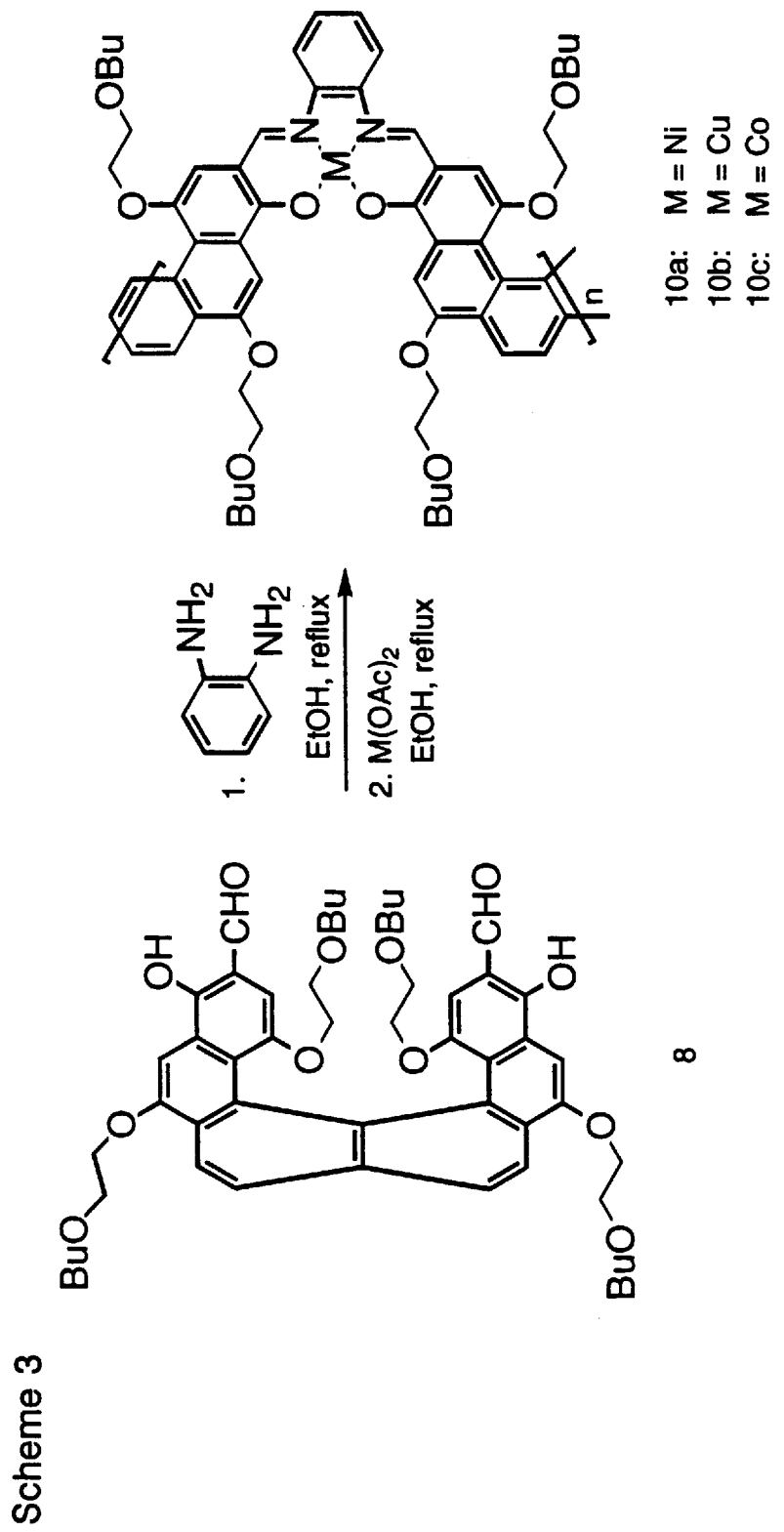
FIG. 8. Reaction scheme 3, showing the synthesis of one embodiment of the helical conjugated ladder polymer depicted in FIG. 2.
Figure 12:
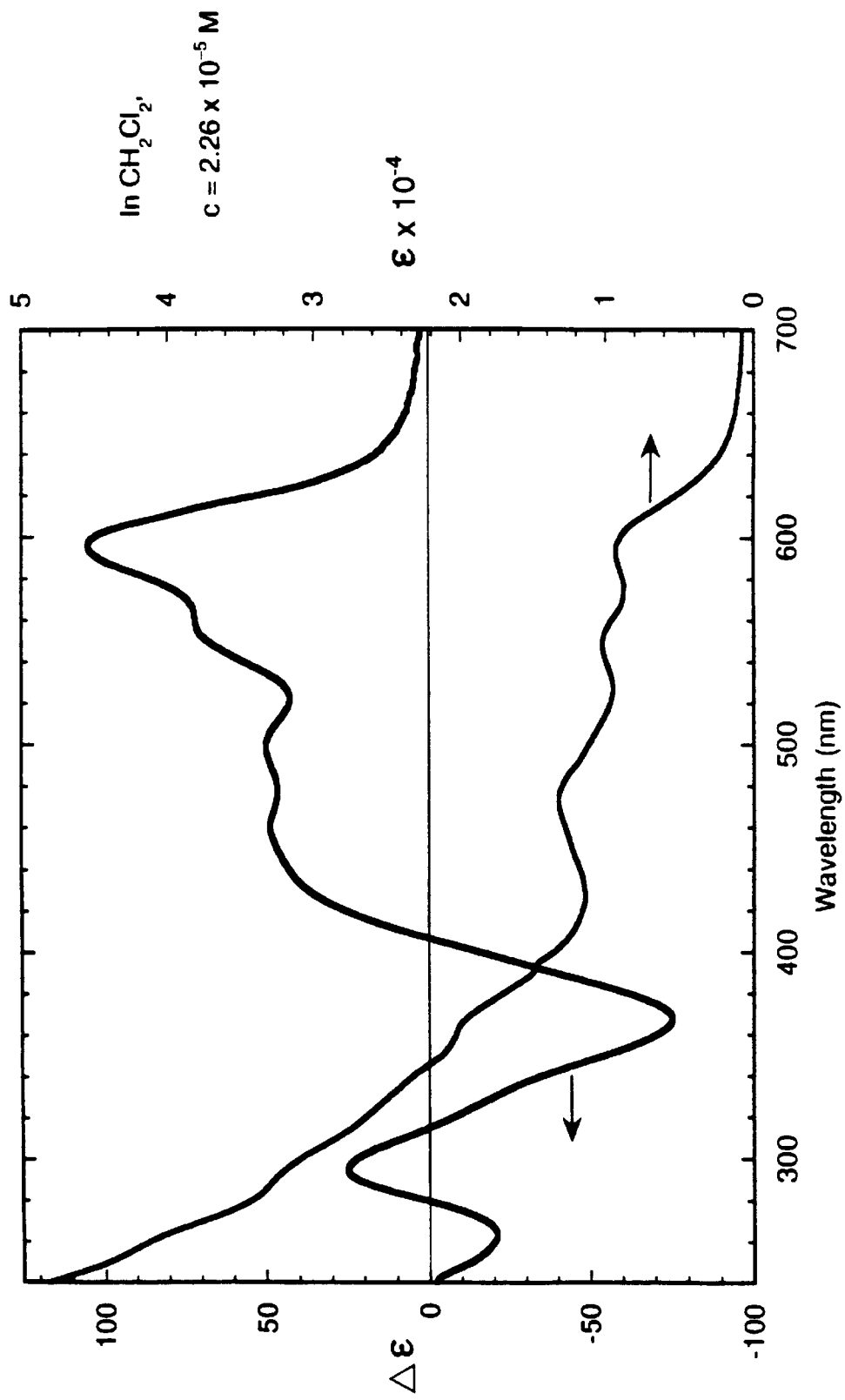
FIG. 12.
Figure 13:
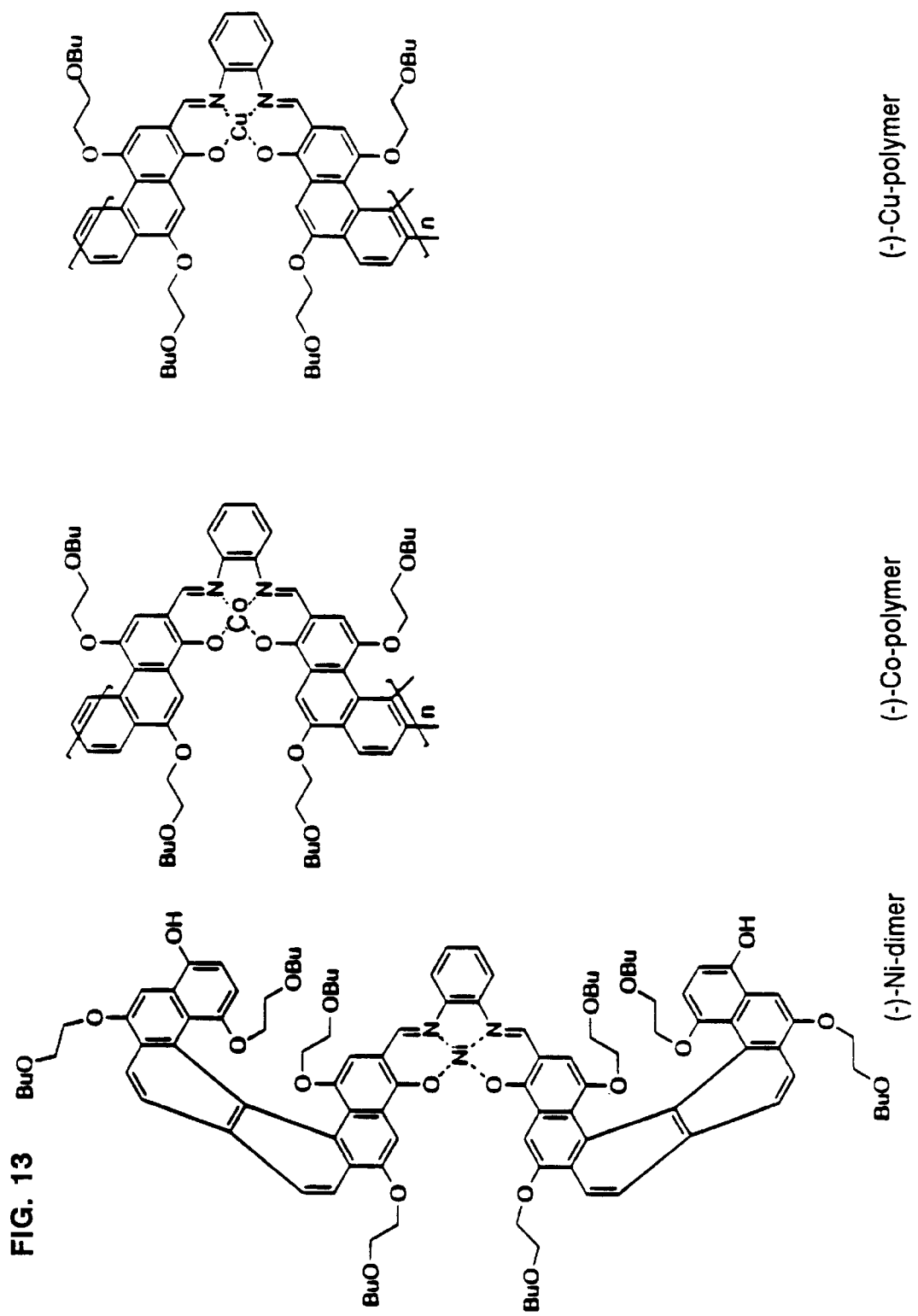
FIG. 13.
Figure 14:
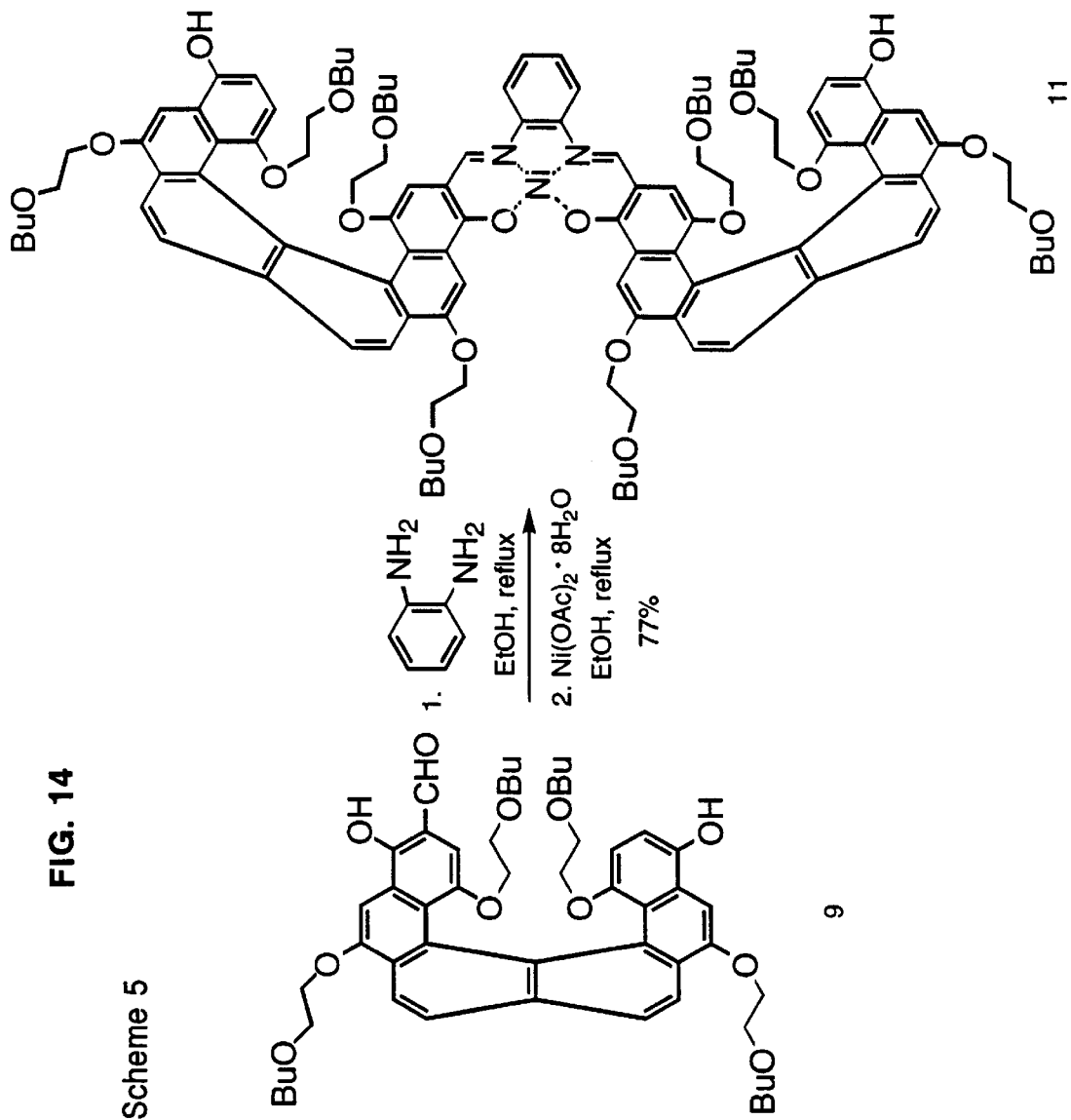
FIG. 14. Reaction scheme 5 shows preparation of a dimer.
Figure 15:
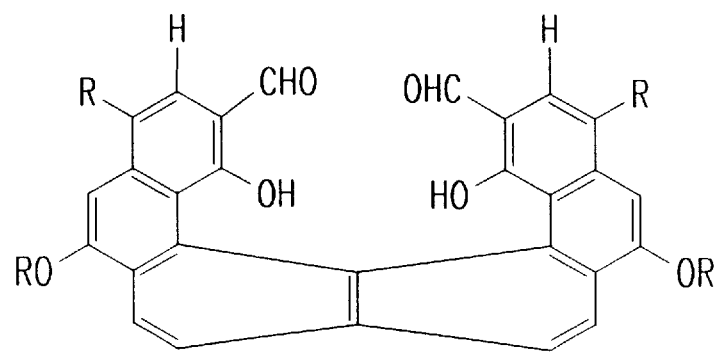
FIG. 15.
Figure 16:
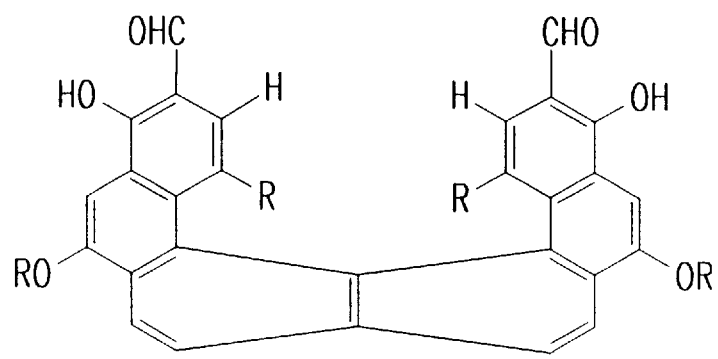
FIG. 16.

Helical bis-salicylaldehyde 2, which was used for the experiments, was synthesized from optically active helical bis-quinone 3 by the procedures outlined in Scheme 2 (FIG. 8). Noteworthy is the selectivity of two steps, the addition of HBr that converts 3 into 4 and the removal of half the acetate functions that converts 5 into 6. The dark red product that formed according to Scheme 1 was purified by dissolving it in $CH_2Cl_2$ and precipitating it by adding hexane. The material is soluble in $CHCl_3$, $CH_2Cl_2$, THF, benzene, acetone, and $CH_3OH$. Thus it does not suffer from the insolubility that is a major deficit of most planar ladder polymers. Evidence that it has structure 1 includes the following. (1) The procedure used is expected to give this structure. (2) The $^1H$ NMR spectrum of a $CDCl_3$ solution shows four clearly defined broad peaks-broad, probably, because of the viscosity-whose intensities are those required and whose positions are, with the exception of the resonances of the outermost portions of the side chains, shifted upfield, most likely by electron currents in nearby rings, by ca. 1 ppm from their positions in the spectra of 2 and of nickel salophen itself. The intensities of resonances related to the CHO and OH resonances in 2 are tiny. (3) The $^{13}C$ NMR spectrum of 1 in $CDCl_3$, although it consists of broad and multiple peaks (presumably because the material is a mixture of oligomers and because in small polymers some carbons are nearer the ends while others are nearer the middle), exhibits resonances that match those of 2, with these differences: the aldehyde resonance, which in 2 appears at d 193.7 ppm, is barely visible, and one of the low-field resonances of 2 (attributable to the carbon next to the phenoxide) is shifted. Resonances at 124 and at 143 ppm may be attributable to the phenylene moiety, and a small, but distinctive one at 179 ppm to an end-group (see below). (3) The infrared spectrum of a sample in KBr shows a peak at 1596 $cm^{-1}$, appropriate for the C=N stretch of a nickel salophen. There is neither a C=O nor an OH stretching absorption. (4) The Matrix-Assisted Laser Desorption/Ionization-Time Of Flight mass spectrum, consists of two peaks separated by 90.0±0.2 daltons that repeat ten times with decreasing intensity at intervals of 837.6±0.2 daltons. This last figure is exactly the mass of the repeat unit of structure 1 ($C_{48}H_{46}N_2NiO_8$).

The mass spectrum also identifies the end-groups. The repeating motif of two peaks distinguishes two series of polymers. The simplest member of one series has the mass of 2 plus $Ni(OAc)_2$ less HOAc, implying that one end has the o-hydroxybenzaldehyde functionality of 2, while the other probably looks like 10. The second, and probably predominant, series has the additional mass (90.1) of one phenylenediamine less water. It is probably capped as in 11. This structure for the end group also accounts for the $^{13}C$ NMR at d 179 ppm mentioned above, a characteristic of carboxylic acids. A small but prominent pair of resonances in the $^1H$ NMR spectrum of the oligomers at d 4.6 and 4.5 ppm, at lower fields than the other $OCH_2$ resonances and at a position characteristic of the hydrogens on one of the $OCH_2$ groups in precursor 2 (undoubtedly the one closest to the benzene rings), suggests that the number average molecular weight is ca. 7,000. Their total intensity is ca. 0.48 protons per unit of helix. This accords with $M_n$ 7400 according to GPC analysis of a solution in THF and the assumption that a published correction applies that relates the weights of certain rigid rod polymers and polystyrenes.

The optical properties of 1 differ from those of simpler molecules. The feature at longest wavelength in the UV spectrum of a methylene chloride solution is a peak at 594 nm, with $\epsilon$=9,300. Although its position is that of d-d transitions in simple salophens, the intensity (calculated per unit monomer concentration as if the polymer were infinite) is ca. 60 times larger. Accordingly, we assign the peak to the "metal-to-ligand" charge transfer band of nickel salophen, but shifted to longer wavelength by 114 nm from its position in the spectrum of the parent compound (480 nm), possibly because the energy of the HOMO is raised by the electron-donating substituents. The circular dichroism (CD) of this peak is very large. At the maximum at longest wavelength (595 nm) $\Delta\epsilon$, calculated as before, is 105, much higher than the value, ca. 3, shown by the simpler metal Schiff base complexes studied previously.

EXAMPLE 1

THF was distilled from sodium benzophenone ketyl. $CH_2Cl_2$ and $Et_3N$ were distilled from $CaH_2$. Anhydrous DMF, purchased from Aldrich, was dried under argon over 4 Å molecular sieves. HBr (30%) in acetic acid and 1M KOt-Bu in THF were purchased from Aldrich. Flash chromatography was performed on 32–63 $\mu$m silica gel from ICN Pharmaceuticals.

(P)-4: HBr (30%) in HOAC (550 $\mu$L, 2.76 mmol) was added in drops to a stirred solution at −25° C. of 500 mg (0.806 mmol) of (P)-3 in 25 mL of propanoic acid contained in a 100 mL round bottomed flask capped with a drying tube. After it had been stirred further at −25° C. for 30 min, the mixture was poured into 100 mL of phosphate buffer solution (pH=7.0) and extracted with $CH_2Cl_2$ (3×20 mL). The extract was washed twice with water, and then 500 mg (0.407 mmol) of tetrachloro-1,4-benzoquinone was added. The mixture was shaken for ca. 5 min and then washed thoroughly with saturated aq $NaHCO_3$, an emulsion that formed being broken by filtration through a pad of celite. Washing with brine, drying with $MgSO_4$, evaporation, and flash chromatography on silica gel, eluting with toluene/dry THF (39:1), gave 237 mg (a yield of 38%) of dark red solid. IR (KBr): 2931, 2866, 1656, 1595, 1513, 1303, 1257, 1227, 1135, 1006, 767 cm$^{-1}$; $^1H$ NMR (400 MHz, CDCl$_3$): $\delta$ 8.47 (d, 2 H, J=8.6 Hz), 7.99 (d, 2 H, J=8.6 Hz), 7.54 (s, 2 H), 7.35 (s, 2 H), 4.59 (m, 2 H), 4.49 (m, 2 H), 4.01 (m, 4 H), 3.65 (t, 4 H, J=6.6 Hz), 1.67 (m, 4 H), 1.45 (m, 4 H), 0.97 (t, 6 H, J=7.4 Hz) ppm; $^{13}$C-NMR (75 Hz, CDCl$_3$): $\delta$ 182.3, 178.9, 159.1, 140.3, 137.8, 133.4, 133.2, 131.4, 128.9, 127.8, 126.6, 125.6, 122.4, 102.1, 71.5, 68.9, 68.8, 31.8, 19.3, 14.0 ppm.

(P)-5: A 35 mL round bottomed flask containing 189 mg (0.243 mmol) of (P)-4 and 338 mg (1.94 mmol) of $Na_2S_2O_4$ was evacuated and filled with argon. After 5 mL of $H_2O$ (previously boiled and then cooled under argon) and 9 mL of dry $CH_2Cl_2$ were added, the mixture was shaken vigorously until the color turned to yellow. The organic phase was separated, and the aqueous phase was quickly extracted with a small amount of $CH_2Cl_2$. The combined organic phases were dried with $MgSO_4$ for ca. 5 min, and after it had been filtered, the drying reagent was washed with ca. 2 mL of $CH_2Cl_2$. The organic solution was deaerated by freezing, pumping, and thawing it, and then 1.05 mL of $Ac_2O$ was added, followed by 1.30 mL of dry $Et_3N$. After 8 h of reflux and cooling to room temperature, 5 mL of $H_2O$ and 1 mL of $Et_3N$ were added, and the mixture was stirred at room temperature for 1 h. Extraction with $CH_2Cl_2$, washing with saturated aq $NaHCO_3$ and brine, drying with $MgSO_4$, stripping, and flash chromatography, eluting with n-hexane/EtOAc (3:2), gave 218 mg (a yield of 82%) of yellow solid. IR (KBr): 2932, 2862, 1766, 1561, 1450, 1424, 1367, 1282, 1171, 1123, 1012, 892 cm$^{-1}$; $^1H$ NMR (400 MHz, acetone-d$_6$): $\delta$ 8.59 (d, 2 H, J=8.5 Hz), 8.26 (d, 2 H, J=8.5 Hz), 7.49 (s, 2 H), 7.40 (s, 2 H), 4.68 (m, 2 H), 4.54 (m, 2 H), 4.03 (t, 4 H, J=4.4 Hz), 3.65 (t, 4 H, J=6.5 Hz), 2.51 (H, 6 H), 1.61 (m, 4 H), 1.45 (m, 4 H), 1.06 (s, 6 H), 0.93 (t, 6 H, J=7.4 Hz) ppm; $^{13}$C NMR (75 MHz, CDCl$_3$): $\delta$ 168.3, 166.5, 153.9, 143.2, 141.2, 131.5, 127.3, 126.8, 126.7, 126.2, 123.4, 122.7, 121.3, 120.6, 109.8, 97.4, 71.4, 69.0, 68.4, 31.8, 21.2, 19.3, 19.2, 13.9 ppm; HRMS calcd for $C_{46}H_{46}O_{12}Br_2Na$ (M+Na) 971.1253, found 971.1271 (PEG+NaCl as reference).

(P)-6: A mixture of 296 mg (0.312 mmol) of (P)-5, 95 mg (0.69 mmol) of $K_2CO_3$, and 15 mL MeOH was deaerated by applying two freeze-pump-thaw cycles and then stirred under argon at room temperature for 3 h. The brown-yellow mixture was acidified with 2N HCl to pH=2, and after 15 mL more of $H_2O$ had been added, the mixture was extracted with $CH_2Cl_2$ (3×15 mL), washed with brine, and dried with $MgSO_4$. The solvent was stripped, 151 mg (1.09 mmol) of $K_2CO_3$ and 7 mL of acetone were added to the residue, followed by 130 $\mu$L (2.09 mmol) of MeI, and the mixture was refluxed under argon for 15 h. The residue remaining after the acetone had been stripped was extracted with 5 mL of $H_2O$ and 10 mL of $CH_2Cl_2$, and the aqueous phase was extracted with additional $CH_2Cl_2$. The combined organic phases were washed with brine and dried with $MgSO_4$. Stripping and flash chromatography, eluting with n-hexane/EtOAc (2:1), gave 226 mg of (a yield of 81%) a yellow solid. $[\alpha]_D$=+1390° (c=0.86 g/100 mL in CHCl$_3$); IR (CHCl$_3$): 2936, 2873, 1757, 1613, 1589, 1459, 1367, 1295, 1133, 1081, 897 cm$^{-1}$; $^1H$ NMR (400 MHz, CDCl$_3$): $\delta$ 8.50 (d, 2 H, J=8.5 Hz), 8.02 (d, 2 H, J=8.5 Hz), 7.65 (s, 2 H), 8.83 (s, 2 H), 4.60 (m, 2 H), 4.47 (m, 2 H), 4.04 (m, 10H), 3.66 (t, 4 H, J=6.6 Hz), 1.65 (m, 4 H), 1.44 (m, 4 H), 1.02 (s, 6 H), 0.96 (t, 6 H, J=7.4 Hz) ppm; $^{13}$C NMR (75 Hz, CDCl$_3$): $\delta$ 167.1, 153.2, 152.4, 137.4, 131.0, 126.7, 126.3, 126.0, 125.1, 123.7, 120.9, 120.3, 110.1, 109.2, 98.3, 71.2, 69.1, 68.4, 56.0, 31.8, 19.2, 19.1, 13.9 ppm; HRMS calcd for $C_{44}H_{46}O_{10}Br_2Na$ (M+Na) 915.1355, found 915.1364.

(P)-7: A flame-dried 25 mL round bottomed flask containing 163 mg (0.182 mmol) (P)-6 was evacuated and filled with argon. Dry THF (4.4 mL) was added, followed by KOt-Bu in THF (401 $\mu$L, 1M, 0.401 mmol). The mixture, which turned immediately red, was stirred at room temperature for 8 min, and then 170 $\mu$L MOMCl (2.19 mmol) was added. The solution turned yellow within 1 min. It was stirred at room temperature for 2.5 h. After 10 mL of $H_2O$ had been added, extraction with $CH_2Cl_2$ (3×10 mL), washing with brine, drying with $MgSO_4$, and flash chromatography, eluting with n-hexane/EtOAc (3:1), gave 150 mg (a 92% yield) of yellow viscous oil. IR (KBr): 2932, 2866, 1612, 1579, 1457, 1441, 1289, 1159, 1131, 940 cm$^{-1}$; $^1$H NMR (400 MHz, CDCl$_3$): δ 8.50 (d, 2 H, J=8.4 Hz), 8.00 (d, 2 H, J=8.4 Hz), 7.58 (s, 2 H), 6.79 (s, 2 H), 4.60 (m, 2 H), 4.43 (m, 2 H), 4.04 (m, 10H), 3.68 (t, 4 H, J=6.6 Hz), 3.29 (d, 2 H, J=6.0 Hz), 3.06 (d, 2 H, J=6.0 Hz), 2.55 (s, 6 H), 1.67 (m, 4 H), 1.47 (m, 4 H), 0.97 (t, 6 H, J=7.40 Hz) ppm; $^{13}$C NMR (75 MHz, CDCl$_3$): δ 152.8, 151.0, 144.8, 131.0, 127.1, 125.8, 125.6, 125.3, 124.0, 120.7, 120.4, 110.1, 109.9, 98.5, 97.8, 71.4, 69.3, 68.2, 56.9, 56.0, 31.9, 19.3, 14.0 ppm; HRMS calcd for $C_{44}H_{50}O_{10}Br_2$ 896.1771, found 896.1737.

Formylation: A 25 mL flame-dried round bottomed flask containing 113 mg (0.126 mmol) of (P)-7 was evacuated and filled with argon. Dry THF (3 mL) was added, and the resulting bright yellow solution was cooled to −78° C. n-BuLi in hexane (210 μL, 2.5M, 0.525 mmol) was added in drops, whereupon the color immediately turned orange-yellow. The mixture was stirred at −78° C. for 50 min, and then 200 μL (2.52 mmol) of dry DMF was added. Stirring was continued, first at −78° C. for 15 min and then at room temperature for 2.5 h. Saturated aq NH$_4$Cl (2 mL) was added, whereupon the color of the mixture turned back to bright yellow. Extraction with $CH_2Cl_2$ (3×10 mL), washing with brine, drying with MgSO$_4$, and, after removal of solvent, flash chromatography, eluting with n-hexane/EtOAc (1.8:1) gave, first small amount of impurities, and then two yellow fractions.

The 1st fraction: (P)-9, 16 mg, 16% yield. [α]$_D$=+1340° (c=0.8 g/100 mL in CHCl$_3$); IR (CHCl$_3$): 2935, 2870, 1658, 1598, 1455, 1381, 1293, 1113, 1076, 1048, 961 cm$^{-1}$; $^1$H NMR (400 MHz, CDCl$_3$): δ 9.61 (s, 1H), 8.57 (d, 1H, J=8.4 Hz), 8.52 (d, 1H, J=8.4 Hz), 8.07 (d, 1H, J=8.4 Hz), 8.01 (d, 1H, J=8.4 Hz), 7.62 (s, 1H), 7.61 (s, 1H), 6.98 (s, 1H), 6.48 (d, 1H, J=8.5 Hz), 6.10 (d, 1H, J=8.5 Hz), 4.60 (m, 2 H), 4.48 (m, 2 H), 4.06 (m, 4 H), 4.03 (s, 3 H), 3.95 (s, 3 H), 3.83 (d, 1H, J=6.6 Hz), 3.70 (m, 4 H), 3.53 (d, 1H, J=6.6 Hz), 3.20 (d, 1H, J=6.2 Hz), 2.99 (d, 1H, J=6.2 Hz), 2.64 (s, 6 H), 1.69 (m, 4 H), 1.48 (m, 4 H), 0.98 (t, 6 H, J=7.3 Hz) ppm; $^{13}$C NMR (75 MHz, CDCl$_3$): δ 189.7, 155.6, 154.0, 152.6, 150.8, 149.8, 146.8, 131.2, 130.0, 128.2, 126.5, 125.5, 125.4, 125.1, 124.8, 124.5, 123.4, 120.7, 120.0, 119.3, 118.6, 108.3, 106.1, 100.5, 99.1, 98.5, 98.1, 94.6, 71.5, 71.4, 69.3, 69.2, 68.5, 68.4, 56.8, 56.1 (twice as intense as the other methoxyl resonances and probably includes two that overlap), 55.3, 31.9, 19.4, 14.0 ppm. The one missing resonance for an aromatic carbon is presumed to overlap one of the peaks that is observed. HRMS (FAB) calcd for $C_{45}H_{52}O_{11}$ 768.3510, found 768.3523.

The 2nd fraction: (P)-8, 80 mg, yellow viscous oil, 80% yield. [α]$_D$=+1840° (c=1.10 g/100 mL in CHCl$_3$); IR (CHCl$_3$): 2931, 2872, 1667, 1608, 1457, 1390, 1300, 1121, 1080, 955 cm$^{-1}$; $^1$H NMR (400 MHz, CDCl$_3$): δ 9.61 (s, 2 H, CHO), 8.58 (d, 2 H, J=8.4 Hz), 8.08 (d, 2 H, J=8.4 Hz), 7.63 (s, 2 H), 6.93 (s, 2 H), 4.64 (m, 2 H), 4.50 (m, 2 H), 4.07 (t, 4 H, J=4.7 Hz), 4.00 (s, 6 H), 3.70 (t, 4 H, J=6.6 Hz), 3.33 (d, 2 H, J=6.1 Hz), 3.09 (d, 2 H, J=6.1 Hz), 2.63 (s, 6 H), 1.69 (m, 4 H), 1.48 (m, 4 H), 0.99 (s, 6 H, J=7.3 Hz) ppm; $^{13}$C-NMR (75 MHz, CDCl$_3$): δ 189.2, 155.4, 153.2, 151.3, 131.9, 130.5, 128.2, 126.3, 125.1, 123.6, 123.4, 120.9, 119.3, 101.2, 99.2, 98.6, 71.5, 69.2, 68.6, 56.9, 56.0, 31.8, 19.4, 14.0 ppm; HRMS (FAB) calcd for $C_{46}H_{52}O_{12}Na$ (M+Na) 819.3356, found 819.3329.

(P)-2: Concd H$_2$SO$_4$ (4 drops) was added to a stirred solution under argon of 80 mg of (P)-8 (0.100 mmol) dissolved in 5 mL AcOH-H$_2$O (3:1 v/v), and stirring was continued at 55°–60° C. for 2 h. After it had been cooled to room temperature, the reaction mixture was slowly poured into 30 mL of saturated aq NaHCO$_3$, extracted with CH$_2$Cl$_2$ (4×10 mL), washed with brine, and dried with MgSO$_4$. Evaporation of the solvent gave 67 mg of yellow solid (a 96% yield) whose $^1$H NMR spectrum showed no evidence of more than the tiniest traces of impurities. [α]$_D$=+4430° (c=0.0705 g/100 mL in CH$_2$Cl$_2$); IR (KBr): 2931, 2862, 1604, 1510, 1422, 1320, 1232, 1155, 1126, 1076, 836 cm$^{-1}$; $^1$H NMR (400 MHz, CDCl$_3$): δ 11.21 (s, 2 H, OH), 9.41 (s, 2 H, CHO), 8.49 (d, 2 H, J=8.5 Hz), 8.04 (d, 2 H, J=8.5 Hz), 7.52 (s, 2 H), 6.47 (s, 2 H), 4.62 (m, 2 H), 4.47 (m, 2 H), 4.06 (t, 4 H, J=3.9 Hz), 3.95 (s, 6 H), 3.69 (t, 4 H, J=6.6 Hz), 1.69 (m, 4 H), 1.49 (m, 4 H), 0.98 (t, 6 H, J=7.4 Hz) ppm; $^{13}$C NMR (125 MHz, CDCl$_3$): δ 193.7, 156.9, 155.1, 147.8, 131.6, 131.4, 129.2, 126.6, 125.3, 124.8, 120.7, 116.5, 112.2, 104.9, 97.6, 71.4, 69.0, 68.2, 56.2, 31.8, 19.3, 13.9 ppm193.75, 156.90, 155.12, 147.81, 131.56, 131.36, 129.16, 126.55, 125.26, 124.79, 120.70, 116.52, 112.16, 104.91, 97.65, 71.45, 69.00, 68.23, 56.19, 31.78, 19.30, 13.94 ; HRMS (FAB) calcd for $C_{42}H_{44}O_{10}$, 708.2935, found 708.2925.

Ni-polymer (1): A 10 mL round bottomed flask containing 37 mg (0.052 mmol) of 2 was evacuated and filled with argon. A solution was added of 5.65 mg (0.0523 mol) 1,2-phenylenediamine in 2 mL ethanol, and the mixture was refluxed. The bis-salicylaldehyde gradually dissolved and the mixture turned into a clear and red solution. Refluxing overnight (12 h) precipitated a lot of red material on the wall of the flask. The ethanol was rotovaped to ca. 0.5 mL, and then 1.5 mL of dry THF was added. The solids all then dissolved. More 1,2-phenylenediamine (ca. 0.5 mg, 4.6 μmol) was added, and after the mixture had refluxed for 2 h, a solution was added of 13 mg (0.052 mmol) of Ni(OAc)$_2$·4 H$_2$O in 0.6 mL ethanol. The color immediately turned very dark. The mixture was refluxed under argon for another 12 h, and after it had cooled to room temperature, the solvent was removed in vacuo. The residue was dissolved in 1.5 mL CH$_2$Cl$_2$ and precipitated with n-hexane. After centrifugation and decantation, the residue was redissolved in 2 mL of THF and precipitated with n-hexane. The precipitation was repeated, giving 42 mg of dark red solid (a 95% yield). IR (KBr): 2929, 2863, 1596, 1581, 1543, 1510, 1420, 1361, 1242, 1206, 1129, 826 cm$^{-1}$. $^1$H NMR (400 MHz, CDCl$_3$): there are four broad groups of resonances, at δ 8.3–6.6, 6.4–5.0, 4.7–2.3, and 2.0–0.6 ppm, in the intensity ratio of 4.0:3.0:8.3:7.7. This compares with the ratios of protons in the structure, which are as follows: 7 aromatic and imine, 9 aliphatics next to oxygen, and 7 other aliphatics. There are tiny peaks at δ 9.28 and 10.87 ppm. The ratio of the intensities of the resonance at d 9.28 and all the other resonances is 0.08:46, implying, since the infinite polymer would have formula $(C_{48}H_{46}NiN_2O_8)_n$, that there is 1 CHO groups for every 25 salophen units. Further purification, by dissolving the material in ca. 3 mL of CH$_2$Cl$_2$ and precipitating it with n-hexane, gave ca. 26 mg of a solid that looked black, gave red solutions, and showed CD and UV spectra that were identical to those of the sample prior to this last reprecipitation. Anal. Calcd for $(C_{48}H_{46}N_2NiO_8)$: C, 68.83; H, 5.54; N, 3.34; Ni, 7.01%. Found: C, 64.51; H, 5.24; N, 3.89 (by Desert Analytics); Ni, 7.99% (by Galbraith Laboratories). [α]$_D$+4,900° (c 0.086 mg/100 mL, CH$_2$Cl$_2$)

EXAMPLE 2

Reactions requiring anhydrous conditions were conducted in flame-dried glassware under an atomsphere of argon.

THF was distilled from sodium/benzophenoe ketyl and CH$_2$Cl$_2$ from CaH$_2$. TMEDA was dried over KOH. Anhydrous DMF and anhydrous diisopropylethylamine were purchased from Aldrich Chemical Co. and used as obtained. The matrix for all FAB mass spectra was m-nitrobenzyl alcohol. Specific rotations were always measured at room temperature using solutions in CHCl$_3$.

(-)-2: Hexahelicene bisquinone (-)-1 (1.00 g, 1.61 mmol) was added to a stirred mixture under argon of Zn powder (3.20 g, 48.9 mmol), dry DMF (6.5 mL), TMEDA (1.94 mL, 12.8 mmol), and isobutyric anhydride (2.15 mL, 13.0 mmol) in a flame-dried two-necked round bottomed flask that was cooled to 0° C. After stirring at 0° C. for 1 h and then at room temperature for15 h, the mixture was diluted with 10 mL of THF and filtered through a pad of celite (which was washed with THF). The solution was then stirred for 1 h with a mixture of water(1.5 mL) and triethylalmine (2 mL), and after 10 more mL of water had been added, was extracted with CH$_2$Cl$_2$ (3×20 mL). Washing with 10 mL of saturated Na$_2$CO$_3$ solution,10 mL of dil HCl, 10 mL of H$_2$O, and 10 mL of brine, drying with Na$_2$SO$_4$, and evaporation, gave 1.45 g of a yellow solid (100% yield). Mp 216°–217° C. (benzene-hexane); $^1$H-NMR (400 MHz, CDCl$_3$): δ 8.48 (d, 2 H, J=8.3 Hz), 8.01 (d, 2 H, 8.3 Hz), 7.15 (s, 2 H), 6.91 (d, 2 H, J=8.2 Hz), 6.28 (d, 2 H, J=8.3 Hz), 4.44 (m, 4 H), 4.04 (m, 4 H), 3.69 (t, 4 H, J=6.2 Hz), 3.05 (m, 2 H), 1.67 (m, 4 H), 1.49 (m, 16 H), 1.22 (m, 2 H), 0.98 (t, 6 H, J=7.3 Hz), 0.75 (d, 6 H, J=7.0 Hz), 0.30 (d, 4 H, J=7.0 Hz) ppm; $^{13}$C-NMR (75 MHz, CDCl$_3$): δ 175.4, 174.5, 153.6, 144.0, 143.1, 131.4, 127.3, 127.1, 126.5, 125.6, 124.2, 120.9, 120.4, 118.8, 116.0, 97.1, 71.5, 69.1, 68.3, 34.3, 32.4, 31.9, 19.4, 19.2, 18.8, 17.4, 14.0 ppm; IR (KBr): 2931, 2859, 1750, 1619, 1605, 1456, 1293, 1125 cm$^{-1}$; HRMS (FAB): calcd for C$_{54}$H$_{64}$O$_{12}$ 904.4398, found 904.4367.

(-)-3: A mixture of 300 mg of (-)-2 (0.332 mmol) and 100 mg of K$_2$CO$_3$ (0.73 mmol) in 15 mL of methanol under argon was stirred at room temperature for 3 h. As TLC analysis showed the reaction to be complete, the mixture was acidified to pH 2–3 with dil HCl and poured into 15 mL of water. Extraction with CH$_2$Cl$_2$ (3×15 mL), washing with brine, drying with Na$_2$SO$_4$, and removal of solvent in vacuo left 251 mg of a brown-yellow solid (a 99% yield). $^1$H-NMR (400 MHz, CDCl$_3$): δ 8.49 (d, 2 H, J=8.4 Hz), 8.00 (d, 2 H, J=8.4 Hz), 7.35 (s, 2 H), 6.70 (br, 2 H, OH), 5.85 (d, 2 H, J=8.4 Hz), 5.77 (d, 2 H, J=8.4 Hz), 4.41 (m, 2 H), 4.25 (m, 2 H), 4.00 (m, 4 H), 3.70 (t, 4 H, J=6.7 Hz),1.68 (m, 4 H), 1.47 (m, 4 H), 1.19 (m, 2 H), 0.98 (t, 6 H, J=7.4 Hz), 0.72 (d, 6 H, J=7.0 Hz), 0.24 (d, 6 H, J=7.0 Hz) ppm; $^{13}$C-NMR (75 MHz, CDCl$_3$): δ 176.6, 152.4, 148.7, 139.6, 131.0, 126.9, 126.1, 125.5, 124.4, 124.1, 120.3, 115.5, 110.0, 98.1, 71.5, 69.3, 68.1, 32.5, 31.8, 19.3, 18.9, 17.6, 13.9 ppm; IR (KBr): 3418, 2963, 2931, 2868, 1764, 1606, 1417, 1240, 1205, 1059, 919 cm$^{-1}$.

(-)-4: A solution of 111 mg of Br$_2$ (0.69 mmol) in 3 mL of CCl$_4$ contained in a dropping funnel capped with a drying tube was added in drops during ca. 20 min to 254 mg of (-)-3 (0.332 mmol) dissolved in 10 mL of 3:1 (v/v) CCl$_4$—CH$_2$Cl$_2$ that was cooled to 0° C. by an ice bath. The mixture was stirred at room temperature for 1 h. Then 2 mL of saturated aq NaHSO$_3$ was added, and after the mixture had been stirred for a few minutes, 5 mL of water was added. Extraction with CH$_2$Cl$_2$ (3×15 mL), washing with water and brine, drying with MgSO$_4$, and evaporation of the solvent gave a brown-yellow solid, which was placed in a 25 mL Schlenk flask. This was evacuated and filled with argon, and then 6 mL of dry CH$_2$Cl$_2$ was added, followed by 696 mL of i-Pr$_2$NEt (3.98 mmol) and 250 mL of MOMCl (3.32 mmol). After refluxing under argon for 20 h, the mixture was cooled, washed with saturated aq Na$_2$CO$_3$, water, and brine, and dried with MgSO$_4$. The solvent was removed in vacuo and the residue flash chromatographed, eluting with n-hexane-EtOAc (3:1). Obtained were 268 mg of an orange solid (an 81% yield). $^1$H-NMR (400 MHz, CDCl$_3$): δ 8.48 (d, 2 H, J=8.2 Hz), 8.02 (d, 2 H, J=8.2 Hz), 7.60 (s, 2 H), 6.37 (s, 2 H), 5.37 (d, 2 H, J=5.8 Hz), 5.31 (d, 2 H, J=5.8 Hz), 4.54 (m, 2 H), 4.48 (m, 2 H), 4.05 (m, 4 H), 3.80 (s, 6 H), 3.68 (t, 2 H, J=6.8 Hz), 1.67 (m,4 H), 1.47 (m, 4 H), 1.17 (m, 2 H), 0.98 (t, 6 H, J=8.0 Hz), 0.72 (d, 6 H, J=7.0 Hz), 0.27 (d, 6 H, J=7.0 Hz) ppm; $^{13}$C-NMR (100 MHz, CDCl$_3$): d 174.0, 154.0, 147.4, 142.8, 131.3, 129.5, 126.65, 126.58, 125.6, 120.5, 120.0, 119.0, 112.4, 100.6, 98.5, 71.3, 68.9, 68.4, 58.3, 32.4, 31.8, 19.2, 18.5, 17.3, 13.9 ppm; IR (CHCl$_3$): 2937, 2864, 1753, 1607, 1445, 1345, 1272, 111, 944 cm$^{-1}$; HRMS (FAB) calcd for C$_{50}$H$_{58}$O$_{12}$Br$_2$ 1008.2290, found 1008.2300.

(-)-5: A 100 mL dry Schlenk flask containing 800 mg of (-)-4 (0.792 mmol) and 383 mg of K$_2$CO$_3$ (2.77 mmol) was evacuated and filled with argon. A solution of 862 mg of TSOCH$_2$CH$_2$OBu (3.17 mmol) in 40 mL of ethanol was cannulated into the flask, and the mixture was refluxed under argon for 27 h. The solvent was removed, and 20 mL of H$_2$O was added to the residue. After extraction with EtOAc (3×20 mL), which was washed with brine and dried with MgSO$_4$, the solvent was rotavaped and the residue purified by flash chromatography, eluting with 3:1 (v/v) n-hexane-EtOAc. Obtained were 609 mg (a 72% yield) of viscous yellow oil. $^1$H-NMR (400 MHz, acetone-d$_6$,): δ 8.49 (d, 2 H, J=8.4 Hz), 8.13 (d, 2 H, J=8.4 Hz), 7.51 (s, 2 H), 6.12 (s, 2 H), 5.33 (d, 2 H, J=6.2 Hz), 5.29 (d, 2 H, J=6.2 Hz), 5.56 (m, 4 H), 4.05 (m, 4 H), 3.81 (s, 6 H), 3.67 (t, 4 H, J=6.5 Hz), 3.17 (m, 2 H), 3.01 (m, 4 H), 2.82 (m, 2 H), 2.70–2.59 (m, 4 H), 1.63 (m, 4 H), 1.46 (m, 4 H), 1.06 (m, 4 H), 0.94 (m, 10 H), 0.65 (t, 6 H, J=7.3 Hz) ppm; $^{13}$C-NMR (75 MHz, acetone-d$_6$): δ 154.9, 152.0, 144.1, 131.6, 130.7, 129.7, 128.7, 127.0, 125.7, 120.6, 117.7, 113.7, 107.5, 101.4, 98.8, 71.7, 71.3, 69.8, 69.4, 68.5 (4C), 58.2, 32.7, 32.320.0, 19.6, 14.2, 14.0 ppm; IR (CHCl3): 2923, 2868, 1605, 1574, 1347, 1284, 1116 cm$^{-1}$, 953 cm$^{-1}$; HRMS (FAB) calcd for C$_{54}$H$_{70}$O$_{12}$Br$_2$ 1068.3230, found 1068.3220.

Formylation of (-)-5: n-BuLi in hexane (168 mL, 2.5M, 0.419 mmol) was added to a stirred solution of 204 mg (0.191 mmol) (-)-5 in 6 mL of THF, cooled to −78° C. in a flame-dried 25 mL RBF. After it had stirred at −78° C. for 30 min, 0.3 mL dry DMF was added, and stirring was continued at −78° C. for 10 min and at room temperature for 2.5 h. After the addition of 3 mL of saturated aq NH$_4$Cl, extraction with ether (2×15 mL), washing with 2N HCl, water, and brine, drying with MgSO$_4$, and removal of the solvent, the residue was flash chromatographed, eluting with n-hexane-EtOAc (1.5:1). A small amount of an impurity eluted first, followed by two fractions that were collected.

The first fraction: (-)-7, 34 mg (19% yield). $^1$H-NMR (400 MHz, CDCl$_3$): δ 10.34 (s, 1 H), 8.52 (d, 1 H, J=8.4 Hz), 8.49 (d, 1 H, J=8.4 Hz), 8.06 (d, 1 H, J=8.4 Hz), 8.01 (d, 1 H, J=8.4 Hz), 7.52 (s, 1 H), 7.46 (s, 1 H), 6.72 (d, 1 H, J=8.6 Hz), 6.24 (s, 1 H), 5.76 (d, 1 H, J=8.6 Hz), 5.29 (m, 4 H), 4.52 (m, 4 H), 4.07 (m, 4 H), 3.72 (s, 3 H), 3.70 (m, 4 H), 3.60 (s, 3 H), 3.22 (m, 1 H), 3.02 (m, 2 H), 2.91–2.55 (m, 9 H), 1.68 (m, 4 H), 1.47 (m, 4 H), 1.12 (m, 4 H), 0.98 (m, 10 H), 0.71 (m, 6 H) ppm; $^{13}$C-NMR (75 MHz, CDCl$_3$): δ 189.7, 154.2, 153.1, 151.5, 151.2, 149.4, 146.0, 130.6, 128.1, 128.0, 127.7, 127.2, 126.3, 126.0, 125.8, 125.37, 125.31, 125.1, 122.7, 120.2, 119.5, 117.8, 111.0, 103.8, 102.4, 98.5, 97.6, 97.5, 96.0, 71.6, 71.5, 71.05, 71.00, 69.25, 69.16, 68.37, 68.26, 68.0, 67.7, 67.6, 67.5, 58.1, 56.1, 31.9, 31.5, 31.4, 19.3, 18.9, 18.8, 14.0, 13.7 ppm; IR (CHCl$_3$): 2941, 2850, 1673. 1610, 1592, 1456, 1356, 1298, 1112, 962 cm$^{-1}$; HRMS (FAB) calcd for C$_{55}$H$_{72}$O$_{13}$ 940.4973, found 940.4988.

The second fraction: (-)-6, 108 mg (58% yield). $^1$H-NMR (400 MHz, CDCl$_3$): δ 10.28 (s, 2 H), 8.51 (d, 2 H, J=8.4 Hz), 8.07 (d, 2 H, J=8.4 Hz), 7.47 (s, 2 H), 6.23 (s, 2 H), 5.31 (d, 2 H, J=6.0 Hz), 5.25 (d, 2 H, 6.0 Hz), 4.52 (m, 4 H), 4.06 (m, 4 H), 3.72 (s, 6 H), 3.69 (t, 4 H, J=6.8 Hz), 3.21 (m, 2 H), 2.98 (m, 4 H), 2.77 (m, 2 H), 2.55–2.68 (m, 4 H), 1.68 (m, 4 H), 1.47 (m, 4 H), 1.08 (m, 4 H), 0.98 (m, 10 H), 0.69 (t, 6 H, J=7.2 Hz) ppm; $^{13}$C-NMR (J=100 MHz, CDCl$_3$): δ 189.3, 154.2, 151.7, 151.1, 133.2, 130.7, 127.9, 127.8, 127.2, 126.3, 125.6, 122.4, 120.1, 102.5, 98.8, 97.971.6, 71.1, 69.1, 68.5, 67.8, 67.7, 58.2, 31.9, 31.4, 19.4, 18.9, 14.0, 13.8 ppm; IR (CHCl$_3$): 2955, 2927, 2871, 1675, 1586, 1451, 1385, 1297, 1124, 1063, 951 cm$^{-1}$; HRMS (FAB) calcd for C$_{56}$H$_{72}$O$_{14}$ 968.4922, found 968.4903.

(-)-9: One drop of concentrated H$_2$SO$_4$ was added to a solution of 23 mg (0.024 mmol) (-)-7 in 2 mL 3:1 (v/v) of HOAc-H$_2$O, and the mixture under argon was stirred at 60° C. for 2 h. After it had been cooled, the mixture was poured slowly in 10 mL of saturated aq Na$_2$CO$_3$, extracted with CH$_2$Cl$_2$ (3×5 mL), which was then washed with brine, dried with MgSO$_4$, and evaporated. The crude product was purified by prepative TLC on silica gel, eluting with 1.5: 1 n-hexane-EtOAc. The yield was 14 mg (67%). $^1$HNMR (400 MHz, CDCl$_3$): δ 11.88 (s, 1 H, OH), 9.57 (s, 1 H, CHO), 8.53 (d, 1 H, J=8.4 Hz), 8.52 (d, 1 H, J=8.4 Hz), 8.09 (d, 1 H, J=8.4 Hz), 8.02 (d, 1 H, J=8.4 Hz)7.64 (s, 1 H), 7.45 (s, 1 H), 6.40 (d,1 H, J=8.4 Hz), 5.81 (s,1 H), 5.69 (d, 1 H, J=8.4 Hz), 5.47 (br, 1 H, OH), 4.07 (m, 4 H), 3.70 (m, 4 H) ppm. $[\alpha]_D$=−1140°.

(-)-8: Concentrated H$_2$SO$_4$ (5 small drops) was added to a solution of108 mg of (-)-6 (0.112 mmol) dissolved in 8 mL of 3:1 (v/v) AcOH-H$_2$O, and the mixture under argon was stirred at 60° C. for 2 h. After it had been cooled, the mixture was slowly poured into 50 mL of saturated aq NaHCO$_3$ and extracted with CH$_2$Cl$_2$ (3×10 mL), which was washed with brine, dried with MgSO$_4$, and evaporated, giving 94 mg of a yellow sticky material (a 96% yield). $[a]_D$=−1150°; $^1$H NMR (400 MHz, CDCl$_3$): δ 11.96 (s, 2 H, OH), 9.66 (s, 2 H, CHO), 8.60 (d, 2 H, J=8.5 Hz), d 8.14 (d, 2 H, J=8.5 Hz), 7.71 (s, 2 H), 5.93 (s, 2 H), 4.57 (m, 4 H), 4.09 (m, 4 H), 3.71 (t,4 H, J=6.6 Hz), 3.11 (m, 2 H), 2.96 (m, 2 H), 2.84 (m, 2 H), 2.79–2.40 (m, 6 H), 2.59 (m, 2 H), 1.70 (m, 4 H), 1.50 (m, 4 H), 1.13 (m, 4 H), 1.00 (m, 10 H), 0.72 (t, 6 H, J=7.3 Hz) ppm; $^{13}$C (75 MHz, CDCl$_3$): δ 195.6 (CO), 154.1, 153.8, 147.8, 130.7, 127.6, 127.0, 126.6, 123.8, 123.2, 123.2, 114.3, 102.7, 98.0, 71.4, 71.0, 69.1, 68.5, 67.8, 67.7, 31.9, 31.4, 19.3, 18.9, 13.9, 13.7 ppm; IR (CHCl$_3$): 2950, 2932, 2869, 1642, 1597, 1452, 1372, 1309, 1115, 904 cm$^{-1}$; HRMS (FAB) calcd for C$_{52}$H$_{64}$O$_{12}$ 880.4398, found 880.4394.

(-)-Ni-dimer 11: After 12 mg of (-)-9 (14 mmol), 0.76 mg of 1,2-phenylenediamine (7.0 mmol), and 1 mL of ethanol under argon had been refluxed for 6 h, 5.3 mg of Ni (OAc)$_2$·4H$_2$O (21 mmol) in 0.5 mL of ethanol was added to the dark red solution, which was then stirred for 3 h. The solvent was removed in vacuo. The product (10 mg, a 77% yield) was precipitated by adding n-hexane to the residue dissolved in 0.5 mL of CH$_2$Cl$_2$. $[a]_D$=−550°; IR (CHCl$_3$): 2927, 2864, 1602, 1450, 1356, 1320, 1116 cm$^{-1}$; MS (FAB): 1836 (M$^+$+H)

(-)-Ni-Polymer 10a: After 53 mg of (-)-8 (60 mmol), 6.5 mg 1,2-phenylenediamine (60 mmol), and 1.5 mL of ethanol under argon had been refluxed 6 h (red solution), a solution of 15 mg Ni (OAc)$_2$·4H$_2$O (60 mmol) in 1 mL ethanol was added, whereupon the mixture immediately turned rust-brown. It was refluxed for 4 h. After it had cooled, ethanol was removed in vacuo.

The product, a black solid (60 mg, a 98% yield) was precipitated by adding n-hexane to the residue dissolved in 1 mL of CH$_2$Cl$_2$. $[a_D$=+1560°; IR (CHCl$_3$): 2927, 2864, 1597, 1576, 1450, 1351, 1116 cm$^{-1}$; Anal. Calcd. for (C$_{58}$H$_{66}$O$_{10}$N$_2$Ni) n: C, 68.98; H, 6.59; N, 2.77; Ni, 5.81; Found: C, 67.30; H, 6.45; N, 3.17; Ni, 6.01.

(-)-Cu-polymer 10b: The preparation, from (-)-8 (11 mg, 12 mmol), o-phenylenediamine (1.4 mg, 12 mmol) and Cu(OAc)$_2$·H$_2$O (2.5 mg, 12 mmol) followed the same procedure as for Ni-polymer. The yield of brown-red solid was 12 mg, 92%. IR (CHCl$_3$): 2927, 2864, 1602, 1576, 1450, 1351, 1116 cm$^{-1}$.

(-)-Co-polymer 10c: The preparation, from (-)-8 (9 mg, 10 mmol) and Co(OAc)$_2$·4H$_2$O (2.5 mg, 10 mmol) followed the same procedure as for Ni-polymer. The yield of brown solid was 10 mg, 100%. IR (CHCl$_3$): 2933, 2866, 1604, 1579, 1458, 1352, 1120 cm$^{-1}$.

What is claimed is:

1. A helical ladder polymer having the structure:

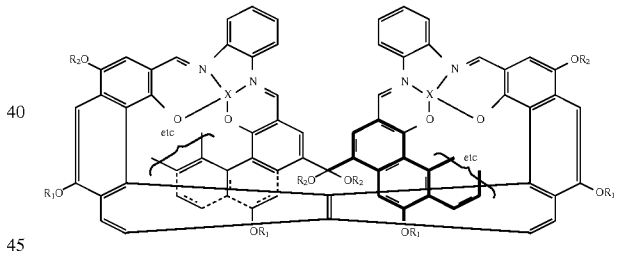

wherein R$_1$ and R$_2$ may be the same or different and each may be an aryl group substituted or unsubstituted, an arylalky group substituted or unsubstituted, a straight or branched alkyl group substituted or unsubstituted, or a straight or branched alkenyl group substituted or unsubstituted; and X is a metal.

2. The helical ladder polymer of claim 1 wherein R$_1$ is CH$_2$CH$_2$OCH$_2$CH$_2$CH$_2$CH$_3$;

R$_2$ is Me; and

X is Ni, Cu or Co.

3. A helical ladder polymer having the structure:

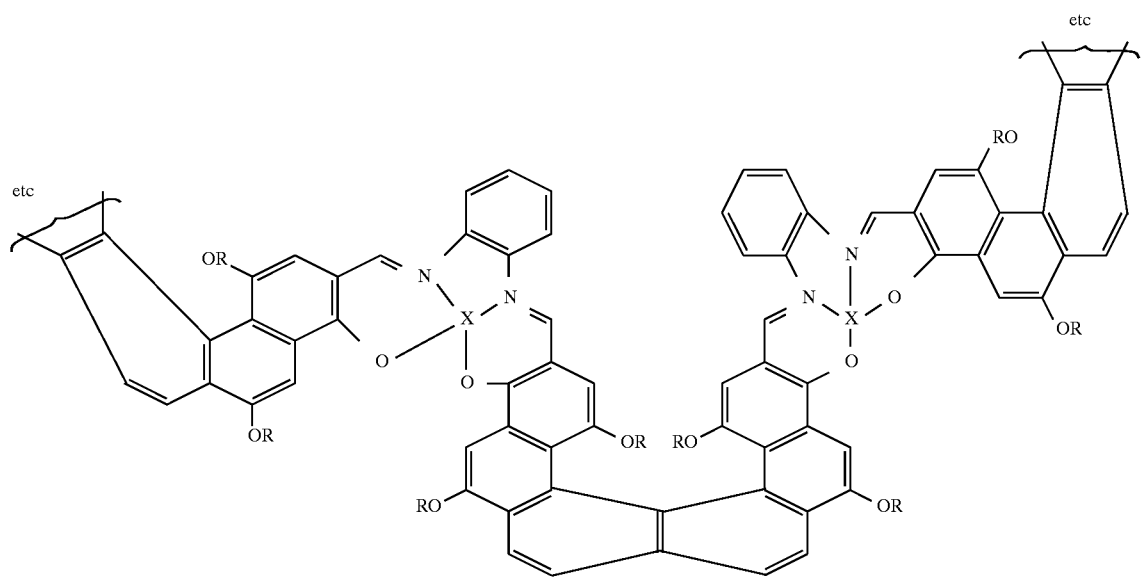

wherein R is an aryl group substituted or unsubstituted, an arylalkyl group substituted or unsubstituted, a straight or branched alkyl group substituted or unsubstituted, or a straight or branched alkenyl group substituted or unsubstituted; and X is a metal.

4. The helical ladder polymer of claim 3 wherein R is $CH_2CH_2OCH_2CH_2CH_2CH_3$;

and X is Ni, Cu or Co.

5. The polymer of claim 1 that is non-racemic.
6. The polymer of claim 2 that is non-racemic.
7. A process for synthesizing a helical ladder polymer having the structure:

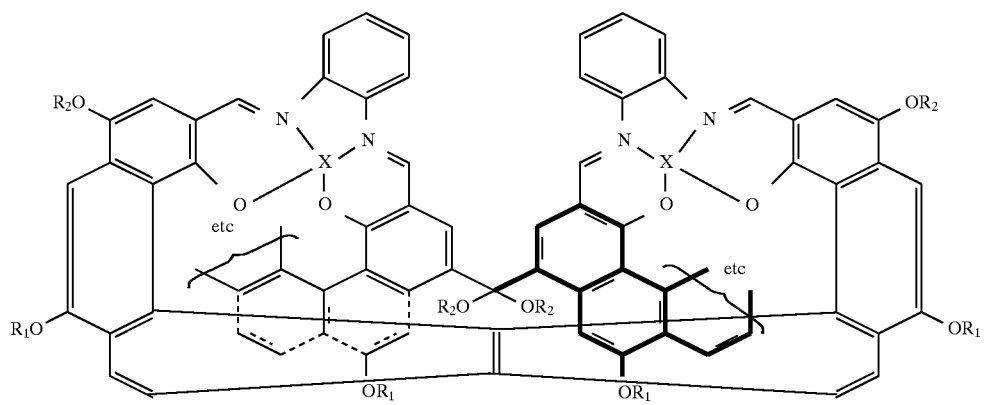

wherein $R_1$ and $R_2$ may be the same or different and each may be an aryl group substituted or unsubstituted, an arylalky group substituted or unsubstituted, a straight or branched alkyl group substituted or unsubstituted, or a straight or branched alkenyl group substituted or unsubstituted; and
X is a metal which comprises:

reacting a compound having a structure:

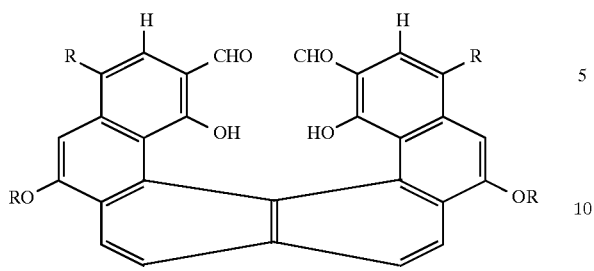

wherein R is an aryl group substituted or unsubstituted, an arylalkyl group substituted or unsubstituted, a straight or branched alkyl group substituted or unsubstituted, or a straight or branched alkenyl group substituted or unsubstituted with 1,2 -phenylenediamine and a metal chelating agent selected from the group of metal salts to form the helical ladder polymer.

8. A process for synthesizing a helical ladder polymer having the structure:

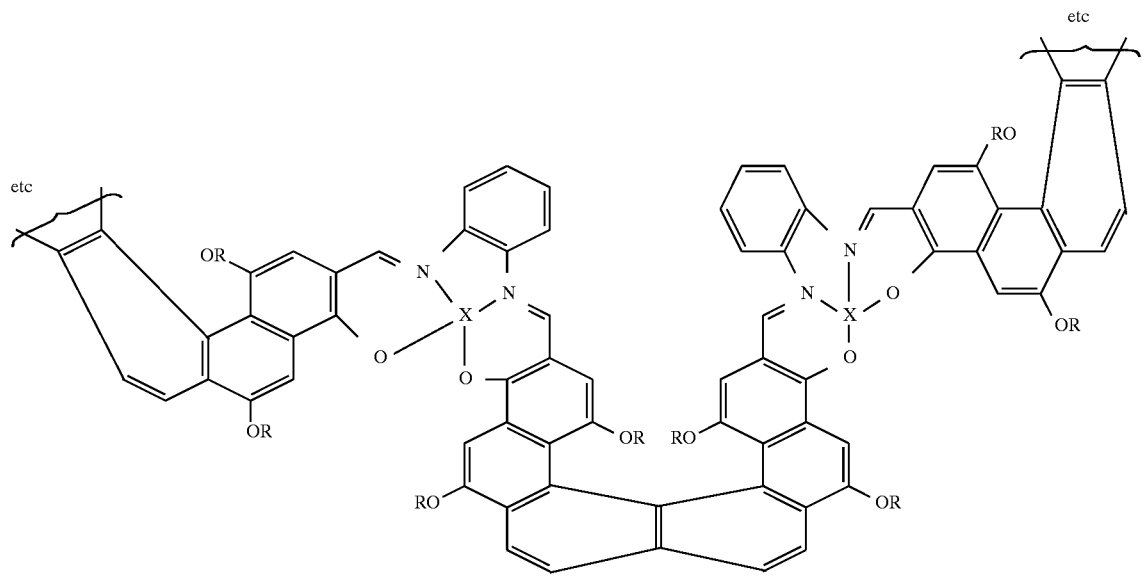

wherein R is an aryl group substituted or unsubstituted, an arylalkyl group substituted or unsubstituted, a straight or branched alkyl group substituted or unsubstituted, or a straight or branched alkenyl group substituted or unsubstituted; and X is a metal which comprises:

reacting a compound having the structure:

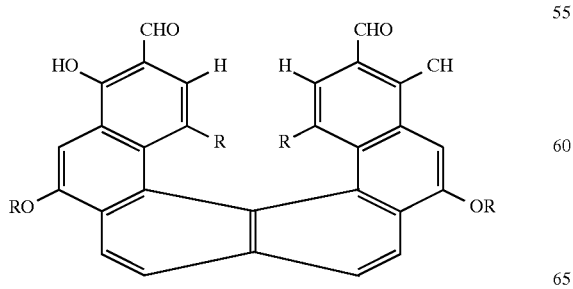

wherein R is an aryl group substituted or unsubstituted, an arylalkyl group substituted or unsubstituted, a straight or branched alkyl group substituted or unsubstituted, or a straight or branched alkenyl group substituted or unsubstituted with 1,2-phenylenediamine and a metal chelating agent selected from the group of metal salts to form the helical ladder polymer.

9. A process for making an optically active ladder polymer comprising reacting a helicene having salicylaldehyde's functionality at each end with a 1,2-phenylenediamine and a metal chelating agent.

* * * * *